(12) United States Patent
Takahashi et al.

(10) Patent No.: US 7,657,610 B2
(45) Date of Patent: Feb. 2, 2010

(54) AUTHENTICATION OUTPUT SYSTEM, NETWORK DEVICE, DEVICE UTILIZATION APPARATUS, OUTPUT DATA MANAGEMENT APPARATUS, OUTPUT CONTROL PROGRAM, OUTPUT REQUEST PROGRAM, OUTPUT DATA MANAGEMENT PROGRAM, AND AUTHENTICATION OUTPUT METHOD

(75) Inventors: Yusuke Takahashi, Nagano (JP); Naruhide Kitada, Nagano (JP)

(73) Assignee: Seiko Epson Corporation (JP)

( * ) Notice: Subject to any disclaimer, the term of this patent is extended or adjusted under 35 U.S.C. 154(b) by 583 days.

(21) Appl. No.: 11/226,748

(22) Filed: Sep. 14, 2005

(65) Prior Publication Data
US 2006/0064742 A1    Mar. 23, 2006

(30) Foreign Application Priority Data

Sep. 17, 2004  (JP)  ............................. 2004-270888
Jun. 28, 2005  (JP)  ............................. 2005-188390

(51) Int. Cl.
*G06F 15/16* (2006.01)

(52) U.S. Cl. ...................... 709/219; 709/229; 358/1.14; 358/1.17; 358/1.2

(58) Field of Classification Search ................. 709/219, 709/229; 358/1.14, 1.17, 12
See application file for complete search history.

(56) References Cited

U.S. PATENT DOCUMENTS

| | | | | |
|---|---|---|---|---|
| 4,020,290 | A | * | 4/1977 | Perna et al. .................. 370/381 |
| 5,740,028 | A | * | 4/1998 | Sugiyama et al. ............ 725/149 |
| 6,564,337 | B1 | * | 5/2003 | Yoneda et al. .................. 714/4 |
| 2005/0216473 | A1 | * | 9/2005 | Aoyagi et al. .................. 707/10 |
| 2006/0195702 | A1 | * | 8/2006 | Nakamura et al. ........... 713/190 |

FOREIGN PATENT DOCUMENTS

| | | |
|---|---|---|
| JP | 04-364971 | 12/1992 |
| JP | H07-276744 | * 10/1995 |
| JP | H09-237170 | * 9/1997 |
| JP | 2002-370407 | 12/2002 |

* cited by examiner

*Primary Examiner*—Bunjob Jaroenchonwanit
*Assistant Examiner*—Hua Fan
(74) *Attorney, Agent, or Firm*—Harness, Dickey & Pierce, P.L.C.

(57) ABSTRACT

An authentication output system including: a network device that performs an output based on output data; and a device utilization apparatus that utilizes the network device, the network device and the device utilization apparatus being communicably connected to each other, and the network device performing the output through authentication.

14 Claims, 17 Drawing Sheets

| JOB ID | TRANSMISSION PROCEDURE IDENTIFIER | DIVISION PROCEDURE IDENTIFIER |
|---|---|---|
| 2334 | 19300 | 2 |
| 2335 | 17238 | 1 |
| | | |
| | | |

| DIVISION PROCEDURE IDENTIFIER | DESCRIPTION OF DIVISION PROCEDURE |
|---|---|
| 1 | IMAGE DATA IS NOT INCLUDED IN FIRST DIVIDED PRINT DATA. |
| 2 | 5 BITS OF IMAGE DATA ARE EXTRACTED FOR EVERY 1000 BITS BEGINNING WITH TOP OF IMAGE DATA AND STORED AS FIRST DIVIDED PRINT DATA. |
| 3 | 7 BITS OF IMAGE DATA ARE EXTRACTED FOR EVERY 1250 BITS BEGINNING WITH TOP OF IMAGE DATA AND STORED AS FIRST DIVIDED PRINT DATA. |
| 4 | 15 BITS OF IMAGE DATA ARE EXTRACTED FOR EVERY 2500 BITS BEGINNING WITH TOP OF IMAGE DATA AND STORED AS FIRST DIVIDED PRINT DATA. |
| 5 | 15 BITS OF IMAGE DATA ARE EXTRACTED FOR EVERY 2500 BITS BEGINNING WITH TOP OF IMAGE DATA, ENCODED, AND RE-INSERTED INTO ORIGINAL POSITION (WHICH, IN THIS CASE, ARE NOT INCLUDED) IN FIRST DIVIDED PRINT DATA |
| 6 | |
| 7 | |

FIG. 7

| | | |
|---|---|---|
| 422 | JOB ID | 2334 |
| 424 | DATE AND TIME | 2004/6/8 18:17:19 |
| 426 | USER NAME | Takahashi |
| 428 | USER ID | 35053 |
| 430 | HOST APPELLATION | Teminal15 |
| 432 | ADDRESS | 192.168.0.5 |
| 434 | TRANSMISSION PROCEDURE IDENTIFIER | 19300 |
| 436 | DIVISION PROCEDURE IDENTIFIER | 2 |
| 438 | PRINT SETTING INFORMATION | PAPER=A4, DOUBLE-SIDE PRINTING=off, COLOR PRINTING=on, PRINT COPIES=1 ····· |

FIG. 9

422 — JobID=2334
424 — Date=2004/6/8 18:17:19
426 — UserName=Takahashi
428 — UserID=35053
430 — TerminalID=Terminal15
432 — ID address=192.168.0.5
434 — Send=Port:19300
436 — DivID=2
438 — Setting=" Paper=A4, Duplex=off, Colorprint=on, Copy=1 ····"
《IMAGE DATA BINARY PORTION   CUTOUT PORTION》
· · · · · · · · · · · · · ·

FIG.10A

《IMAGE DATA BINARY PORTION   PARTIALLY CUT OUT》
· · · · · · · · · · · · · · · · · · · · · · · · · · · · · · · · ·
· · · · · · · · · · · · · · · · · · · · · · · · · · · · · · · · ·

FIG.10B

```
422 ─── JobID=2335
424 ─── Date=2004/6/8 19:17:19
426 ─── UserName=Takahashi
428 ─── UserID=35053
430 ─── TerminalID=Terminal15
432 ─── ID address=192.168.0.5
434 ─── Send=Port:17238
436 ─── DivID=1
438 ─── Setting=" Paper=A4, Duplex=off, Colorprint=on, Copy=1 · · · · "
```

FIG.11A

```
《IMAGE DATA BINARY PORTION》
 . . . . . . . . . . . . . . . . . . . . . . . . . . . . . . . .
 . . . . . . . . . . . . . . . . . . . . . . . . . . . . . . . .
```

FIG.11B

| UER INFORMATION | IDENTIFICATION INFORMATION OF DIVIDED PRINT DATA | TRANSMISSION PROCEDURE IDENTIFIER | IP ADDRESS |
|---|---|---|---|
| USER X | 00000001 | 12345 | 192.168.0.5 |
| USER Y | 00000030 | 32423 | 192.168.0.100 |
| USER X | 00000002 | 61234 | 192.168.0.5 |
| USER X | 00000003 | 23456 | 192.168.0.5 |

AUTHENTICATION OUTPUT SYSTEM, NETWORK DEVICE, DEVICE UTILIZATION APPARATUS, OUTPUT DATA MANAGEMENT APPARATUS, OUTPUT CONTROL PROGRAM, OUTPUT REQUEST PROGRAM, OUTPUT DATA MANAGEMENT PROGRAM, AND AUTHENTICATION OUTPUT METHOD

RELATED APPLICATIONS

This application claims priority to Japanese Patent Application Nos. 2004-270888 filed Sep. 17, 2004 and 2005-188390 filed Jun. 28, 2005 which are hereby expressly incorporated by reference herein in their entireties.

BACKGROUND OF THE INVENTION

1. Technical Field

The present invention relates to a system, device, apparatus, program, and method that performs an output, such as printing, based on output data. More particularly, the invention relates to an authentication output system, network device, device utilization apparatus, output data management apparatus, output control program, output request program, output data management program, and authentication output method that is suitable for protecting confidentiality of output data or output content.

2. Related Art

In performing printing on a network printer serving as a network device, when a host terminal serving as a user's device utilization apparatus exists at a place away from the network printer, there is the possibility that the content of a print may be seen by someone else before the user goes to the network printer. This is of a problem in the case of printing a confidential document which the user does not want anyone else to see. Therefore, it is demanded that the network printer be provided with a security function.

Conventionally, as technology for improving the security of the network printer, for example, there are a printing apparatus disclosed in Patent Document 1 (JP-A-4-364971) and a recording apparatus disclosed in Patent Document 2 (JP-A-2002-370407).

In the invention of Patent Document 1, first, it is determined whether a print job received from the host terminal is a normal print job or a spool print job (i.e., it is determined whether to immediately print the print job or to put the print job on standby for later printing). If it is determined that the print job is the spool print job, the print job is developed to output data, and the developed output data is stored into a storage device together with job designation information. When the user enters job designation information, then based on the entered job designation information, a print job to be printed is specified from a plurality of print jobs stored in the storage device, and output data of the specified print job is read to perform printing.

In the invention of Patent Document 2, a confidential print request is made through a communication network, and upon reception of at least a password and first-page data, the password and data are stored into a storage section, and an entered password is compared with the password stored in the storage section. If they match each other, the first-page data is printed and recorded, and second-page and subsequent data are received and printed.

However, the invention of Patent Document 1 is configured to hold the output data in the printing apparatus. Therefore, there is the possibility that the output data may be stolen by a fraudulent access, etc. during the time the output data is being transmitted from the host terminal to the printing apparatus, or by the time printing is started after the printing apparatus holds the output data.

Besides, the invention of Patent Document 2 is configured to perform printing when the password is identified. Therefore, for example, when a plurality of users make print requests at the same time or almost at the same time, if those users happen to set the identical password for their own data, there is the possibility that the content of a user's own print may be seen by another user. Furthermore, since this invention is configured to hold the first-page data in the printing apparatus, the first-page data provides the same problem as in the invention of Patent Document 1.

SUMMARY

An advantage of the invention is to provide an authentication output system, network device, device utilization apparatus, output data management apparatus, output control program, output request program, output data management program, and authentication output method that is suitable for protecting confidentiality of output data or output content.

[Aspect 1] To achieve the aforesaid advantage, an authentication output system according to aspect 1 of the invention comprises: a network device that performs an output based on output data; and a device utilization apparatus that utilizes the network device, the network device and the device utilization apparatus being communicably connected to each other, and the network device performing the output through authentication. In this case, the device utilization apparatus has an output data division unit, a first divided output data transmission unit, a collated information transmission unit, and a second divided output data transmission unit. The output data division unit divides the output data. The first divided output data transmission unit transmits to the network device any of divided output data divided by the output data division unit. The collated information transmission unit transmits, to the network device, collated information that includes at least one of identification information for identifying a user, identification information for identifying the device utilization apparatus, and identification information for identifying the output data. The second divided output data transmission unit transmits to the network device all the remaining divided output data out of divided output data divided by the output data division unit, in response to an acquisition request from the network device. Besides, the network device has: a divided output data reception unit, a collated information reception unit, a divided output data save unit, a collation information acquisition unit, a divided output data acquisition unit, an output data configuration unit, and an output unit. The divided output data reception unit receives divided output data transmitted by the first divided output data transmission unit. The collated information reception unit receives collated information transmitted by the collated information transmission unit. The divided output data save unit saves divided output data received by the divided output data reception unit and collated information received by the collated information reception unit, into a divided output data storage unit, in their corresponding relationship. The collation information acquisition unit acquires collation information including the identification information. The divided output data acquisition unit, when determining eligibility to use the output data based on collation information acquired by the collation information acquisition unit and on collated information in the divided output data storage unit, acquires all the remaining divided output data out of the divided output data, from the device utilization apparatus. The output data configuration unit configures the output data, based on divided output data acquired by the divided output data acquisition unit and on corresponding divided output data in the divided output data storage unit. The output unit performs the output based on output data configured by the output data configuration unit.

With such a configuration, in the device utilization apparatus, the output data division unit divides the output data into two or more divided output data. The first divided output data transmission unit transmits any of the thus-divided divided output data to the network device. Thus, the collated information transmission unit transmits the collated information including the identification information to the network device.

In the network device, when the divided output data reception unit receives the divided output data, and the collated information reception unit receives the collated information, then the divided output data save unit saves the received divided output data and the collated information into the divided output data storage unit in their corresponding relationship. Besides, the collation information acquisition unit acquires the collation information including the identification information. When the identification information included in the acquired collation information and the identification information included in any of the collated information saved in the divided output data storage unit, on this occasion, have, for example, an identical or predetermined relationship, then the eligibility to use the output data is determined. Upon determination of the eligibility to use the output data, the divided output data acquisition unit acquires the remaining output data from the device utilization apparatus.

In the device utilization apparatus, the second divided output data transmission unit transmits all the remaining divided output data out of the divided output data divided, to the network device, in response to the acquisition request from the network device.

In the network device, when the divided output data is acquired, the output data configuration unit configures the output data based on the acquired divided output data and on the corresponding divided output data in the divided output data storage unit. Thus, the output unit performs the output based on the configured output data.

Thereby, the output data is divided and the divided output data are separately transmitted to the network device. Therefore, it is possible to reduce the possibility that all the output data may be stolen by a fraudulent access, etc. Besides, the eligibility to use the output data is determined from the collated and collation information that includes the identification information of the user, device utilization apparatus, or output data. Therefore, even if a plurality of users make output requests quite at the same time or almost at the same time, it is possible to reduce the possibility that user's own output content may be seen by another user. Accordingly, it is possible to obtain the effect that the confidentiality of the output data and output content can be more protected than ever before.

Here, the term "collation information" refers to information for determining the eligibility to use the output data by collating it with the collated information, and may be information identical to the collated information or may be information different from the collated information. To determine the eligibility for use, for example, it is determined whether or not the collation information and the collated information have a predetermined relationship. When it is determined that the predetermined relationship is fulfilled, divided output data corresponding to appropriate collated information is acquired. Here, the following conditions are given to fulfill the predetermined relationship: the collation information and the collated information should match each other; the result obtained by using the collation information to perform a calculation by a predetermined arithmetic expression should match the collated information; or the result obtained by using the collation information to perform a calculation by the predetermined arithmetic expression should match the result obtained by using the collated information to perform a calculation by a predetermined arithmetic expression. The same hereinafter applies to the authentication output system of aspect 11, the network device of aspects 12, 16 and 17, the device utilization apparatus of aspect 18, the output data management apparatus of aspect 28, the output control program of aspects 29, 33, and 34, the output request program of aspect 35, the output data, management program of aspect 45, and the authentication output method of aspects 46 and 56.

Besides, the collation information acquisition unit may be of any configuration as long as it is configured to acquire the collation information. For example, the configuration may be such that the collation information is entered from an entry device, etc., such that the collation information is obtained or received from an external terminal, etc., or such that the collation information is read from a recoding device, a storage medium, etc. Accordingly, the term "acquisition" includes entry, obtainment, reception, and read. The same hereinafter applies to the authentication output system of aspect 11, the network device of aspects 12 and 16, and the output data management apparatus of aspect 28.

Besides, the output unit may be of any configuration as long as it is configured to perform an output based on output data. The output unit includes a printing unit that performs printing based on print data, a display unit that performs display based on display data, or a sound output unit that outputs sound based on sound data. For example, a projector and an LCD (Liquid Crystal Display) device correspond to the network device having the display unit. The same hereinafter applies to the authentication output system of aspect 11 and the network device of aspects 12 and 17.

Besides, the output data includes the print data, the display data, and the sound data. In the corresponding relationship of these data with the network device, the print data is used, for example, in a network printer, the display data is used, for example, in a projector, and the sound data is used, for example, in a stereo set. The same hereinafter applies to the authentication output system of aspect 11, the network device of aspects 12, 16, and 17, the device utilization apparatus of aspect 18, the output data management apparatus of aspect 28, the output control program of aspects 29, 33, and 34, the output request program of aspect 35, the output data management program of aspect 45, and the authentication output method of aspects 46 and 56.

Besides, the term "perform the output based on the output data" refers to performing reproduction when the output data is video data, and performing printing when the output data is print data. The print data includes, for example, intermediate data such as a PDL and image data such as a bit map. Accordingly, the term "perform the output based on the output data" means that the printing is performed by converting the print data to a mode understandable by the printer when the print data is the intermediate data, and that the output is performed through a process such as color conversion according to need when the print data is the image data. The same hereinafter applies to the authentication output system of aspect 11, the network device of aspects 12 and 17, the output control program of aspects 29 and 34, and the authentication output method of aspects 46 and 56.

Besides, the term "through authentication" includes to acquire the identification information by a reader for an authentication medium such as a card, or other acquisition units, and to collate authentication information with authenticated information by an authentication unit (which may be disposed outside, such as a server) and thus to determine the validity of the authentication information. The same hereinafter applies to the authentication output system of aspect 11, and the authentication output method of aspects 46 and 56.

Besides, the first divided output data transmission unit and the collated information transmission unit may be configured integrally with each other, or may be configured separately from each other. When they are configured integrally with each other, for example, the collated information can be transmitted with the divided output data included therein. This is the same for the first divided output data transmission unit and the second divided output data transmission unit. The same hereinafter applies to the device utilization apparatus of aspect 18.

Besides, the term "transmit any of the divided output data" refers to transmitting any number, out of 1 to 9, of divided output data when the output data is divided into ten, and not to transmitting all the divided output data. The same hereinafter applies to the authentication output system of aspect 11, the network device of aspect 17, the device utilization apparatus of aspect 18, the output control program of aspect 34, the output request program of aspect 35, and the authentication output method of aspects 46 and 56.

Besides, the term "identification information" refers to information for specifying a user and includes, for example, not only a user name, a login name of a client's PC, and an individual number of an authentication storage medium (e.g., a card), but also an indirectly calculated numeric value, such as a hush value calculated from an authentication medium used in authentication. The same hereinafter applies to the authentication output system of aspect 11, the network device of aspect 17, the device utilization apparatus of aspect 18, the output data management apparatus of aspect 28, the output control program of aspect 34, the output request program of aspect 35, the output data management program of aspect 45, and the authentication output method of aspects 46 and 56.

Besides, to determine the eligibility to use the output data, the network device may make the determination, or any apparatus other than the network device may make the determination. The same hereinafter applies to the authentication output system of aspect 11, the network device of aspects 12, 16, and 17, the output control program of aspects 29, 33, and 34, and the authentication output method of aspects 46 and 56.

Besides, the configuration of the output data includes, for example, combination of the divided output data. The same hereinafter applies to the authentication output system of aspect 11, the network device of aspects 12, 16, and 17, the output control program of aspects 29, 33, and 34, and the authentication output method of aspects 46 and 56.

Besides, the term "utilize the network device" refers to utilizing the function of the network device. The same hereinafter applies to the other aspects.

[Aspect 2] An authentication output system of aspect 2 of the invention is according to aspect 1, wherein the device utilization apparatus has a transmission procedure determination unit and a transmission procedure information transmission unit, and in that the network device has a transmission procedure information reception unit. The transmission procedure determination unit, having a plurality of transmission procedures for transmitting the divided output data, determines any one of the plurality of transmission procedures. The transmission procedure information transmission unit transmits, to the network device, transmission procedure information indicative of a transmission procedure determined by the transmission procedure determination unit. The transmission procedure information reception unit receives the transmission procedure information. In this case, the divided output data save unit is configured to save the divided output data, the collated information, and transmission procedure information received by the transmission procedure information reception unit, into the divided output data storage unit, in their corresponding relationship. The divided output data acquisition unit is configured to, based on the collation information, retrieve the collated information corresponding thereto from within the divided output data storage unit, and to acquire the divided output data based on transmission procedure information corresponding to collated information located by the retrieval. The second divided output data transmission unit is configured to transmit the divided output data in accordance with a transmission procedure determined by the transmission procedure determination unit.

With such a configuration, in the device utilization apparatus, the transmission procedure determination unit determines any one procedure from among the plurality of transmission procedures. The transmission procedure information transmission unit transmits, to the network device, transmission procedure information indicative of the determined transmission procedure.

In the network device, when the transmission procedure information reception unit receives the transmission procedure information, the divided output data save unit saves the divided output data, the collated information, and the received transmission procedure information, into the divided output data storage unit, in their corresponding relationship. Besides, upon determination of the eligibility to use the output data, the divided output data acquisition unit, based on the collation information, retrieves corresponding collated information from within the divided output data storage unit, and acquires the divided output data based on the transmission procedure information corresponding to the located collated information.

In the network device, the second divided output data transmits the divided output data to the network device in accordance with the determined transmission procedure.

Thereby, the divided print data cannot be acquired unless in accordance with the transmission procedure determined by the device utilization apparatus. Therefore, it is possible to reduce the possibility that the divided print data may be stolen by a fraudulent access, etc. from the device utilization apparatus. Accordingly, it is possible to obtain the effect that the confidentiality of the print data can be more reliably protected.

Here, the plurality of transmission procedures include at least different transmission procedures. The same hereinafter applies to the network device of aspect 13, the device utilization apparatus of aspect 19, the output control program of aspect 30, the output request program of aspect 36, and the authentication output method of aspect 47.

[Aspect 3] An authentication output system of aspect 3 of the invention is according to aspect 1, wherein the device utilization apparatus has a second divided output data save unit that saves all the remaining divided output data out of divided output data divided by the output data division unit and the collated information, into a second divided output data storage unit, in their corresponding relationship. In this case, the divided output data acquisition unit is configured to, based on the collation information, retrieve the collated information corresponding thereto from within the divided output data storage unit, and to, when locating the corresponding collated information by the retrieval, transmit the collation information to the device utilization apparatus together with the acquisition request. Besides, the second divided output data transmission unit is configured, when receiving the collation information together with the acquisition request, to, based on received collation information, retrieve the collated information corresponding thereto from within the second divided output data storage unit, and to transmit divided output data corresponding to collated information located by the retrieval.

With such a configuration, in the device utilization apparatus, the second divided output data save unit saves all the remaining divided output data out of the divided output data divided and the collated information, into the second divided output data storage unit, in their corresponding relationship.

In the network device, the divided output data acquisition unit, based on the collation information, retrieves corresponding collated information from within the divided output data storage unit, and when locating the corresponding collated information, transmits the acquired collation information to the device utilization apparatus together with the acquisition request.

In the device utilization apparatus, upon reception of the collation information together with the acquisition request, the second divided output data transmission unit, based on the received collation information, retrieves corresponding collated information from within the second divided output data storage unit, and transmits to the network device the divided output data corresponding to the located collated information.

Thereby, all the remaining divided output data out of the divided output data configuring the output data is saved into the second divided output data storage unit in corresponding relationship with the collated information. Therefore, it is possible to obtain the effect of making it possible to suitably select and transmit divided output data necessary for an output process in the network device, out of divided output data necessary to perform a plurality of processes.

[Aspect 4] An authentication output system of aspect 4 of the invention is according to aspect 1, wherein the device utilization apparatus has a division procedure determination unit and a division procedure information transmission unit, and in that the network device has a division procedure information reception unit. The division procedure determination unit, having a plurality of division procedures for dividing the output data, determines any one of the plurality of division procedures. The division procedure information transmission unit transmits, to the network device, division procedure information indicative of a division procedure determined by the division procedure determination unit. The division procedure information reception unit receives the division procedure information. In this case, the divided output data save unit is configured to save the divided output data, the collated information, and division procedure information received by the division procedure information reception unit, into the divided output data storage unit, in their corresponding relationship. The output data division unit is configured to divide the output data in accordance with a division procedure determined by the division procedure determination unit. The output data configuration unit is configured to configure the output data based on divided output data acquired by the divided output data acquisition unit, on corresponding divided output data in the divided output data storage unit, and on division procedure information.

With such a configuration, in the device utilization apparatus, the division procedure determination unit determines any one out of the plurality of division procedures. The output data division unit divides the output data in accordance with the determined division procedure. Besides, the division procedure information transmission unit transmits division procedure information indicative of the determined division procedure to the network device.

In the network device, when the division procedure information reception unit receives the division procedure information, the divided output data save unit saves the divided output data, the collated information, and the received division procedure information, into the divided output data storage unit, in their corresponding relationship. Besides, upon acquisition of the divided output data, the output data configuration unit configures the output data based on the acquired divided output data, on corresponding divided output data in the divided output data storage unit, and on the division procedure information.

Thereby, the output data cannot be configured unless in accordance with the division procedure determined by the device utilization apparatus. Therefore, it is possible to reduce the possibility that the output content may be leaked even if the divided output data is stolen. Accordingly, it is possible to obtain the effect that the confidentiality of the output content can be more reliably protected.

Here, the plurality of division procedures include at least different division procedures. The same hereinafter applies to the network device of aspect 15, the device utilization apparatus of aspect 21, the output control program of aspect 32, the output request program of aspect 38, and the authentication output method of aspect 49.

[Aspect 5] An authentication output system of aspect 5 of the invention is according to aspect 1, wherein the output data includes output setting information on output setting and content data configuring output content. In this case, the output data division unit is configured to divide the output data into two: first divided output data including the output setting information and second divided output data including the content data. The first divided output data transmission unit is configured to transmit first divided output data divided by the output data division unit. The second divided output data transmission unit is configured to transmit second divided output data divided by the output data division unit.

With such a configuration, in the device utilization apparatus, the output data division unit divides the output data into two: the first divided output data including the output setting information and the second divided output data including the content data. The first divided output data transmission unit transmits the divided first divided output data to the network device. Besides, the second divided output data transmission unit transmits the divided second divided output data to the network device.

Thereby, only the output setting information is included in the first divided output data. Therefore, the output content will not be leaked even in the first divided output data is stolen by a fraudulent access, etc. from the network device. Accordingly, it is possible to obtain the effect that the confidentiality of the output content can be more reliably protected.

Here, the output setting information is, for example, information on print setting when the network device is a printer, and includes information such as a paper size, double-side printing/single-side printing, color/monochrome, and the number of print copies. The same hereinafter applies to the authentication output system of aspect 6, the device utilization apparatus of aspects 22 and 23, the output request program of aspects 39 and 40, and the authentication output method of aspects 50 and 51.

Besides, the content data is, for example, drawing data to be printed out by a printer when the network device is a printer, and includes electronic data to be outputted as physical information. The same hereinafter applies to the authentication output system of aspect 6, the device utilization apparatus of aspects 22 and 23, the output request program of aspects 39 and 40, and the authentication output method of aspects 50 and 51.

[Aspect 6] An authentication output system of aspect 6 of the invention is according to aspect 1, wherein the output data includes output setting information on output setting and content data configuring output content. In this case, the output data division unit is configured to divide the output data into two: first divided output data including the output setting information and part of the content data, and second divided output data including the remaining portion of the content data. The first divided output data transmission unit is configured to transmit first divided output data divided by the output data division unit. The second divided output data transmission unit is configured to transmit second divided output data divided by the output data division unit.

With such a configuration, in the device utilization apparatus, the output data division unit divides the output data into two: first divided output data including the output setting information and part of the content data, and second divided output data including the remaining portion of the content data. The first divided output data transmission unit transmits the divided first divided output data to the network device. Besides, the second divided output data transmission unit transmits the divided second divided output data to the network device.

Thereby, the content data is divided and the divided content data are separately transmitted to the network device. Therefore, it is possible to reduce the possibility that all the content data may be stolen by a fraudulent access, etc. Accordingly, it is possible to obtain the effect that the confidentiality of the output data can be more reliably protected.

[Aspect 7] An authentication output system of aspect 7 of the invention is according to aspect 5, wherein the output data division unit is configured to divide the output data in a division form in which at least two of the divided output data are required for the output data configuration unit to configure one of the output data.

With such a configuration, in the device utilization apparatus, the output data division unit divides the output data in a division form in which at least two of the divided output data are required for the output data configuration unit to configure one of the output data.

Thereby, even if single divided output data is stolen, it is possible to reduce the possibility that part of the output content may be leaked by restoring the single divided output data. Accordingly, it is possible to obtain the effect that the confidentiality of the output content can be more reliably protected.

[Aspect 8] An authentication output system of aspect 8 of the invention is according to aspect 5, wherein the output data division unit is configured, when the output data is classified in units of a predetermined data length, to divide specified bit data of the predetermined data length data from the output data to provide the first divided output data, and to divide all bit data of the predetermined data length data other than the specified bit data from the output data to provide the second divided output data.

With such a configuration, in the device utilization apparatus, the output data division unit divides specified bit data of the predetermined data length data from the output data to provide the first divided output data. For example, when the output data is classified in units of one byte and the specified bit is set to an even bit, data is acquired in units of one byte from the output data, and even bit data is extracted from the acquired data. Thus, the extracted data serves as the first divided output data.

Besides, the output data division unit divides all bit data of the predetermined data length data other than the specified bit data from the output data to provide the second divided output data. In the aforesaid example, data is acquired in units of one byte from the output data, and odd bit data is extracted from the acquired data. Thus, the extracted data serves as the first divided output data.

Thereby, it becomes difficult both to restore the output content from only the first divided print data and to restore the output content from only the second divided print data. Therefore, even if any one of the first and second divided print data is stolen, it is possible to reduce the possibility that the output content may be leaked. Accordingly, it is possible to obtain the effect that the confidentiality of the output content can be more reliably protected.

[Aspect 9] An authentication output system of aspect 9 of the invention is according to aspect 7, wherein the output data division unit is configured, when the output data is classified in units of a predetermined data length, to divide predetermined order data of the output data in units of the predetermined data length from the output data to provide the first divided output data, and to divide data of the output data other than the predetermined order data from the output data to provide the second divided output data.

With such a configuration, in the device utilization apparatus, the output data division unit divides predetermined order data in units of the predetermined data length from the output data to provide the first divided output data. For example, when the output data is classified in unit of one byte and the predetermined order is set to an even order, even order data is extracted in units of one byte from the output data, and the extracted data serves as the first divided output data.

Besides, the output data division unit divides data of the output data other than the predetermined order data from the output data to provide the second divided output data. In the aforesaid example, odd order data is extracted in units of one byte from the output data, and the extracted data serves as the second divided output data.

Thereby, it becomes difficult both to restore the output content from only the first divided print data and to restore the output content from only the second divided print data. Therefore, even if any one of the first and second divided print data is stolen, it is possible to reduce the possibility that the output content may be leaked. Accordingly, it is possible to obtain the effect that the confidentiality of the output content can be more reliably protected.

[Aspect 10] An authentication output system of aspect 10 of the invention is according to aspect 1, wherein the second divided output data transmission unit is configured to transmit the divided output data through a TCP/IP (Transmission Control Protocol/Internet Protocol).

With such a configuration, in the device utilization apparatus, the second divided output data transmission unit transmits the divided output data through the TCP/IP.

[Aspect 11] An authentication output system of aspect 11 of the invention includes: a network device that performs an output based on output data; and an output data management apparatus that manages part of the output data, the network device and the output data management apparatus being communicably connected to each other, and the network device performing the output through authentication. In this case, the network device has an output data division unit, a first divided output data transmission unit, a first divided output data save unit, a first divided output data reception unit, an output data configuration unit, and an output unit. The output data division unit divides the output data. The first divided output data transmission unit transmits to the output data management apparatus any of divided output data divided by the output data division unit. The first divided output data save unit saves all the remaining divided output data out of divided output data divided by the output data division unit, into a first divided output data storage unit, in corresponding relationship with collated information that includes at least one of identification information for identifying a user, identification information for identifying a device utilization apparatus, and identification information for identifying the output data. The first divided output data reception unit receives collation information including the identification information, and the divided output data. The output data configuration unit, when determining eligibility to use the output data based on collation information received by the first divided output data reception unit and on collated information in the first divided output data storage unit, configures the output data based on divided output data received by the first divided output data reception unit and on corresponding divided output data in the first divided output data storage unit. The output unit performs the output based on output data configured by the output data configuration unit. Besides, the output data management apparatus has a second divided output data reception unit, a second divided output data save unit, a collation information acquisition unit, and a second divided output data transmission unit. The second divided output data reception unit receives divided output data transmitted by the first divided output data transmission unit. The second divided output data save unit saves divided output data received by the second divided output data reception unit, into a second divided output data storage unit. The collation information acquisition unit acquires the collation information. The second divided output data transmission unit transmits, to the network device, collation information acquired by the collation information acquisition unit and divided output data in the second divided output data storage unit.

With such a configuration, in the network device, the output data division unit divides the output data, and the first divided output data transmission unit transmits to the output data management apparatus any of the divided output data divided. Besides, the first divided output data save unit saves all the remaining divided output data out of the divided output data divided, into the first divided output data storage unit, in corresponding relationship with collated information.

In the output data management apparatus, when the second divided output data reception unit receives divided output data, the second divided output data save unit saves the received divided output data into the second divided output data storage unit. Besides, when the collation information acquisition unit acquires the collation information, the second divided output data transmission unit transmits, to the network device, the acquired collation information and divided output data in the second divided output data storage unit.

In the network device, the first divided output data reception unit receives collation information and the divided output data. When identification information included in the received collation information and identification information included in any of the collated information stored in the first divided output data storage unit, on this occasion, have, for example, an identical or predetermined relationship, then the eligibility to use the output data is determined. Upon determination of the eligibility to use the output data, the output data configuration unit configures the output data based on the received divided output data and on corresponding divided output data in the first divided output data storage unit. Thus, the output unit that performs the output based on the configured output data.

Thereby, the output data is divided and part of the divided output data is saved into the second divided output data storage unit. Therefore, it is possible to reduce the possibility that all the output data may be stolen by a fraudulent access, etc. Besides, the eligibility to use the output data is determined from the collated and collation information that includes the identification information of the user, device utilization apparatus, or output data. Therefore, even if a plurality of users make output requests quite at the same time or almost at the same time, it is possible to reduce the possibility that user's own output content may be seen by another user. Accordingly, it is possible to obtain the effect that the confidentiality of the output data and output content can be more protected than ever before.

[Aspect 12] To achieve the aforesaid advantage, a network device of aspect 12 of the invention that performs an output based on output data, includes a divided output data reception unit, a collated information reception unit, a divided output data save unit, a collation information acquisition unit, a divided output data acquisition unit, an output data configuration unit, and an output unit. The divided output data reception unit receives divided output data obtained by dividing the output data. The collated information reception unit receives collated information that includes at least one of identification information for identifying a user, identification information for identifying a device utilization apparatus, and identification information for identifying the output data. The divided output data save unit saves divided output data received by the divided output data reception unit and collated information received by the collated information reception unit, into a divided output data storage unit, in their corresponding relationship. The collation information acquisition unit acquires collation information including the identification information. The divided output data acquisition unit, when determining eligibility to use the output data based on collation information acquired by the collation information acquisition unit and on collated information in the divided output data storage unit, acquires all the remaining divided output data out of the divided output data, from the device utilization apparatus. The output data configuration unit configures the output data based on divided output data acquired by the divided output data acquisition unit and on corresponding divided output data in the divided output data storage unit. The output unit performs the output based on output data configured by the output data configuration unit.

Such a configuration makes it possible to obtain the same operation as that of the network device in the authentication output system of aspect 1. Accordingly, the same effect as in the authentication output system of aspect 1 can be obtained.

[Aspect 13] A network device of aspect 13 of the invention is according to aspect 12, further including a transmission procedure information reception unit that receives transmission procedure information indicative of a transmission procedure for transmitting the divided output data. In this case, the divided output data save unit is configured to save the divided output data, the collated information, and transmission procedure information received by the transmission procedure information reception unit, into the divided output data storage unit, in their corresponding relationship. The divided output data acquisition unit is configured to, based on the collation information, retrieve the collated information corresponding thereto from within the divided output data storage unit, and to acquire the divided output data based on transmission procedure information corresponding to collated information located by the retrieval.

Such a configuration makes it possible to obtain the same operation as that of the network device in the authentication output system of aspect 2. Accordingly, the same effect as in the authentication output system of aspect 2 can be obtained.

[Aspect 14] A network device of aspect 14 of the invention is according to aspect 12, wherein the divided output data acquisition unit is configured to, based on the collation information, retrieve the collated information corresponding thereto from within the divided output data storage unit, and to, when locating the corresponding collated information by the retrieval, transmit the collation information to the device utilization apparatus together with the acquisition request.

Such a configuration makes it possible to obtain the same operation as that of the network device in the authentication output system of aspect 3. Accordingly, the same effect as in the authentication output system of aspect 3 can be obtained.

[Aspect 15] A network device of aspect 15 of the invention is according to aspect 12, further including a division procedure information reception unit that receives division procedure information indicative of a division procedure for dividing the output data. In this case, the divided output data save unit is configured to save the divided output data, the collated information, and division procedure information received by the division procedure information reception unit, into the divided output data storage unit, in their corresponding relationship. The output data configuration unit is configured to configure the output data based on divided output data acquired by the divided output data acquisition unit, on corresponding divided output data in the divided output data storage unit, and on division procedure information.

Such a configuration makes it possible to obtain the same operation as that of the network device in the authentication output system of aspect 4. Accordingly, the same effect as in the authentication output system of aspect 4 can be obtained.

[Aspect 16] A network device of aspect 16 of the invention includes a divided output data reception unit, a collated information reception unit, a divided output data save unit, a collation information acquisition unit, a divided output data acquisition unit, and an output data configuration unit. The divided output data reception unit receives divided output data obtained by dividing output data. The collated information reception unit receives collated information that includes at least one of identification information for identifying a user, identification information for identifying a device utilization apparatus, and identification information for identifying the output data. The divided output data save unit saves divided output data received by the divided output data reception unit and collated information received by the collated information reception unit, into a divided output data storage unit, in their corresponding relationship. The collation information acquisition unit acquires collation information including the identification information. The divided output data acquisition unit, when determining eligibility to use the output data based on collation information acquired by the collation information acquisition unit and on collated information in the divided output data storage unit, acquires all the remaining divided output data out of the divided output data, from the device utilization apparatus. The output data configuration unit configures the output data based on divided output data acquired by the divided output data acquisition unit and on corresponding divided output data in the divided output data storage unit.

Such a configuration makes it possible to obtain the same operation as that of the network device in the authentication output system of aspect 1. Accordingly, the same effect as in the authentication output system of aspect 1 can be obtained.

[Aspect 17] To achieve the aforesaid advantage, a network device of aspect 17 of the invention that performs an output based on output data, includes an output data division unit, a divided output data transmission unit, a divided output data save unit, a divided output data reception unit, an output data configuration unit, and an output unit. The output data division unit divides the output data. The divided output data transmission unit transmits to an output data management apparatus any of divided output data divided by the output data division unit. The divided output data save unit saves all the remaining divided output data out of divided output data divided by the output data division unit, into a divided output data storage unit, in corresponding relationship with collated information that includes at least one of identification information for identifying a user, identification information for identifying a device utilization apparatus, and identification information for identifying the output data. The divided output data reception unit receives collation information including the identification information, and the divided output data. The output data configuration unit, when determining eligibility to use the output data based on collation information received by the divided output data reception unit and on collated information in the divided output data storage unit, configures the output data based on divided output data received by the divided output data reception unit and on corresponding divided output data in the divided output data storage unit. The output unit performs the output based on output data configured by the output data configuration unit.

Such a configuration makes it possible to obtain the same operation as that of the network device in the authentication output system of aspect 11. Accordingly, the same effect as in the authentication output system of aspect 11 can be obtained.

[Aspect 18] A device utilization apparatus of aspect 18 of the invention that utilizes a network device, includes an output data division unit, a first divided output data transmission unit, a collated information transmission unit, and a second divided output data transmission unit. The output data division unit divides output data. The first divided output data transmission unit transmits to the network device any of divided output data divided by the output data division unit. The collated information transmission unit transmits, to the network device, collated information that includes at least one of identification information for identifying a user, identification information for identifying the device utilization apparatus, and identification information for identifying the output data. The second divided output data transmission unit transmits to the network device all the remaining divided output data out of divided output data divided by the output data division unit, in response to an acquisition request from the network device.

Such a configuration makes it possible to obtain the same operation as that of the device utilization apparatus in the authentication output system of aspect 1. Accordingly, the same effect as in the authentication output system of aspect 1 can be obtained.

[Aspect 19] A device utilization apparatus of aspect 19 of the invention is according to aspect 18, further including a transmission procedure determination unit and a transmission procedure information transmission unit. The transmission procedure determination unit, having a plurality of transmission procedures for transmitting the divided output data, determines any one of the plurality of transmission procedures. The transmission procedure information transmission unit transmits, to the network device, transmission procedure information indicative of a transmission procedure determined by the transmission procedure determination unit. In this case, the second divided output data transmission unit is configured to transmit the divided output data in accordance with a transmission procedure determined by the transmission procedure determination unit.

Such a configuration makes it possible to obtain the same operation as that of the device utilization apparatus in the authentication output system of aspect 2. Accordingly, the same effect as in the authentication output system of aspect 2 can be obtained.

[Aspect 20] A device utilization apparatus of aspect 20 of the invention is according to aspect 18, further including a second divided output data save unit that saves all the remaining divided output data out of divided output data divided by the output data division unit and the collated information, into a second divided output data storage unit, in their corresponding relationship. In this case, the second divided output data transmission unit is configured, when receiving collation information together with the acquisition request, to, based on received collation information, retrieve the collated information corresponding thereto from within the second divided output data storage unit, and to transmit divided output data corresponding to collated information located by the retrieval.

Such a configuration makes it possible to obtain the same operation as that of the device utilization apparatus in the authentication output system of aspect 3. Accordingly, the same effect as in the authentication output system of aspect 3 can be obtained.

[Aspect 21] A device utilization apparatus of aspect 21 of the invention is according to aspect 18, further including a division procedure determination unit and a division procedure information transmission unit. The division procedure determination unit, having a plurality of division procedures for dividing the output data, determines any one of the plurality of division procedures. The division procedure information transmission unit transmits, to the network device, division procedure information indicative of a division procedure determined by the division procedure determination unit. In this case, the output data division unit is configured to divide the output data in accordance with a division procedure determined by the division procedure determination unit.

Such a configuration makes it possible to obtain the same operation as that of the device utilization apparatus in the authentication output system of aspect 4. Accordingly, the same effect as in the authentication output system of aspect 4 can be obtained.

[Aspect 22] A device utilization apparatus of aspect 22 of the invention is according to aspect 18, wherein the output data includes output setting information on output setting and content data configuring output content. In this case, the output data division unit is configured to divide the output data into two: first divided output data including the output setting information and second divided output data including the content data. The first divided output data transmission unit is configured to transmit first divided output data divided by the output data division unit. The second divided output data transmission unit is configured to transmit second divided output data divided by the output data division unit.

Such a configuration makes it possible to obtain the same operation as that of the device utilization apparatus in the authentication output system of aspect 5. Accordingly, the same effect as in the authentication output system of aspect 5 can be obtained.

[Aspect 23] A device utilization apparatus of aspect 23 of the invention is according to aspect 18, wherein the output data includes output setting information on output setting and content data configuring output content. In this case, the output data division unit is configured to divide the output data into two: first divided output data including the output setting information and part of the content data, and second divided output data including the remaining portion of the content data. The first divided output data transmission unit is configured to transmit first divided output data divided by the output data division unit. The second divided output data transmission unit is configured to transmit second divided output data divided by the output data division unit.

Such a configuration makes it possible to obtain the same operation as that of the device utilization apparatus in the authentication output system of aspect 6. Accordingly, the same effect as in the authentication output system of aspect 6 can be obtained.

[Aspect 24] A device utilization apparatus of aspect 24 of the invention is according to aspect 22, wherein the output data division unit is configured to divide the output data in a division form in which at least two of the divided output data are required for the output data configuration unit to configure one of the output data.

Such a configuration makes it possible to obtain the same operation as that of the device utilization apparatus in the authentication output system of aspect 7. Accordingly, the same effect as in the authentication output system of aspect 7 can be obtained.

[Aspect 25] A device utilization apparatus of aspect 25 of the invention is according to aspect 22, wherein the output data division unit is configured, when the output data is classified in units of a predetermined data length, to divide specified bit data of the predetermined data length data from the output data to provide the first divided output data, and to divide all bit data of the predetermined data length data other than the specified bit data from the output data to provide the second divided output data.

Such a configuration makes it possible to obtain the same operation as that of the device utilization apparatus in the authentication output system of aspect 8. Accordingly, the same effect as in the authentication output system of aspect 8 can be obtained.

[Aspect 26] A device utilization apparatus of aspect 26 of the invention is according to aspect 24, wherein the output data division unit is configured, when the output data is classified in units of a predetermined data length, to divide predetermined order data of the output data in units of the predetermined data length from the output data to provide the first divided output data, and to divide data of the output data other than the predetermined order data from the output data to provide the second divided output data.

Such a configuration makes it possible to obtain the same operation as that of the device utilization apparatus in the authentication output system of aspect 9. Accordingly, the same effect as in the authentication output system of aspect 9 can be obtained.

[Aspect 27] A device utilization apparatus of aspect 27 of the invention is according to aspect 18, wherein the second divided output data transmission unit is configured to transmit the divided output data through a TCP/IP.

Such a configuration makes it possible to obtain the same operation as that of the device utilization apparatus in the authentication output system of aspect 10. Accordingly, the same effect as in the authentication output system of aspect 10 can be obtained.

[Aspect 28] To achieve the aforesaid advantage, an output data management apparatus of aspect 28 of the invention that manages part of output data, includes a divided output data reception unit, a divided output data save unit, a collation information acquisition unit, and a divided output data transmission unit. The divided output data reception unit receives divided output data obtained by dividing the output data. The divided output data save unit saves divided output data received by the divided output data reception unit, into a divided output data storage unit. The collation information acquisition unit acquires collation information that includes at least one of identification information for identifying a user, identification information for identifying a device utilization apparatus, and identification information for identifying the output data. The divided output data transmission unit transmits, to the network device, collation information acquired by the collation information acquisition unit and divided output data in the divided output data storage unit.

Such a configuration makes it possible to obtain the same operation as that of the output data management apparatus in the authentication output system of aspect 11. Accordingly, the same effect as in the authentication output system of aspect 11 can be obtained.

[Aspect 29] To achieve the aforesaid advantage, an output control program of aspect 29 of the invention that performs an output based on output data, includes a program for allowing a computer to execute a process that has a divided output data reception step, a collated information reception step, a divided output data save step, a collation information acquisition step, a divided output data acquisition step, an output data configuration step, and an output step. The divided output data reception step receives divided output data obtained by dividing the output data. The collated information reception step receives collated information that includes at least one of identification information for identifying a user, identification information for identifying a device utilization apparatus, and identification information for identifying the output data. The divided output data save step saves divided output data received in the divided output data reception step and collated information received in the collated information reception step, into a divided output data storage unit, in their corresponding relationship. The collation information acquisition step acquires collation information including the identification information. The divided output data acquisition step, when determining eligibility to use the output data based on collation information acquired in the collation information acquisition step and on collated information in the divided output data storage unit, acquires all the remaining divided output data out of the divided output data, from the device utilization apparatus. The output data configuration step configures the output data based on divided output data acquired in the divided output data acquisition step and on corresponding divided output data in the divided output data storage unit. The output step performs the output based on output data configured in the output data configuration step.

With such a configuration, the program is read by the computer, and when the computer executes the process in accordance with the read program, the same operation and effect as in the network device of aspect 12 can be obtained.

Here, the collation information acquisition step may be of any form as long as the collation information is acquired. For example, the collation information may be entered from an entry device, etc., may be obtained from an external terminal, etc., or may be read from a recording device, a recording medium, etc. Accordingly, the term "acquisition" includes at least entry, obtainment, reception, and read. The same hereinafter applies to the output control program of aspect 33, the output data management program of aspect 45, and the authentication output method of aspects 46 and 56.

Besides, the output step may be of any form as long as an output is performed based on output data. This includes, for example, a printing step of performing printing based on print data, a display step of performing display based on display data, or a sound output step of outputting sound based on sound data. For example, performing display by a projector or an LCD corresponds to the display step. The same hereinafter applies to the output control program of aspects 33 and 34, and the authentication output method of aspects 46 and 56.

[Aspect 30] An output control program of aspect 30 of the invention is according to aspect 29, further including a program for allowing a computer to execute a process that has a transmission procedure information reception step of receiving transmission procedure information indicative of a transmission procedure for transmitting the divided output data. In this case, the divided output data save step saves the divided output data, the collated information, and transmission procedure information received in the transmission procedure information reception step, into the divided output data storage unit, in their corresponding relationship. The divided output data acquisition step, based on the collation information, retrieves the collated information corresponding thereto from within the divided output data storage unit, and acquires the divided output data based on transmission procedure information corresponding to collated information located by the retrieval.

With such a configuration, the program is read by the computer, and when the computer executes the process in accordance with the read program, the same operation and effect as in the network device of aspect 13 can be obtained.

[Aspect 31] An output control program of aspect 31 of the invention is according to aspect 29, wherein the divided output data acquisition step, based on the collation information, retrieves the collated information corresponding thereto from within the divided output data storage unit, and when locating the corresponding collated information by the retrieval, transmits the collation information to the device utilization apparatus together with the acquisition request.

With such a configuration, the program is read by the computer, and when the computer executes the process in accordance with the read program, the same operation and effect as in the network device of aspect 14 can be obtained.

[Aspect 32] An output control program of aspect 32 of the invention is according to step 29, further including a program for allowing a computer to execute a process that has a division procedure information reception step of receiving division procedure information indicative of a division procedure for dividing the output data. In this case, the divided output data save step saves the divided output data, the collated information, and division procedure information received in the division procedure information reception step, into the divided output data storage unit, in their corresponding relationship. The output data configuration step configures the output data based on divided output data acquired in the divided output data acquisition step, on corresponding divided output data in the divided output data storage unit, and on division procedure information.

With such a configuration, the program is read by the computer, and when the computer executes the process in accordance with the read program, the same operation and effect as in the network device of aspect 15 can be obtained.

[Aspect 33] An output control program of aspect 33 of the invention includes a program for allowing a computer to execute a process that has a divided output data reception step, a collated information reception step, a divided output data save step, a collation information acquisition step, a divided output data acquisition step, and an output data configuration step. The divided output data reception step receives divided output data obtained by dividing output data.

The collated information reception step receives collated information that includes at least one of identification information for identifying a user, identification information for identifying a device utilization apparatus, and identification information for identifying the output data. The divided output data save step saves divided output data received in the divided output data reception step and collated information received in the collated information reception step, into a divided output data storage unit, in their corresponding relationship. The collation information acquisition step acquires collation information including the identification information. The divided output data acquisition step, when determining eligibility to use the output data based on collation information acquired in the collation information acquisition step and on collated information in the divided output data storage unit, acquires all the remaining divided output data out of the divided output data, from the device utilization apparatus. The output data configuration step configures the output data based on divided output data acquired in the divided output data acquisition step and on corresponding divided output data in the divided output data storage unit.

With such a configuration, the program is read by the computer, and when the computer executes the process in accordance with the read program, the same operation and effect as in the network device of aspect 16 can be obtained.

[Aspect 34] An output control program of aspect 34 of the invention includes a program for allowing a computer to execute a process that has an output data division step, a divided output data transmission step, a divided output data save step, a divided output data reception step, an output data configuration step, and an output step. The output data division step divides the output data. The divided output data transmission step transmits to an output data management apparatus any of divided output data divided in the output data division step. The divided output data save step saves all the remaining divided output data out of divided output data divided in the output data division step, into a divided output data storage unit, in corresponding relationship with collated information that includes at least one of identification information for identifying a user, identification information for identifying a device utilization apparatus, and identification information for identifying the output data. The divided output data reception step receives collation information including the identification information, and the divided output data. The output data configuration step, when determining eligibility to use the output data based on collation information received in the divided output data reception step and on collated information in the divided output data storage unit, configures the output data based on divided output data received in the divided output data reception step and on corresponding divided output data in the divided output data storage unit. The output step performs the output based on output data configured in the output data configuration step.

With such a configuration, the program is read by the computer, and when the computer executes the process in accordance with the read program, the same operation and effect as in the network device of aspect 17 can be obtained.

[Aspect 35] To achieve the aforesaid advantage, an output request program of aspect 35 of the invention that utilizes a network device, includes a program for allowing a computer to execute a process that has an output data division step, a first divided output data transmission step, a collated information transmission step, and a second divided output data transmission step. The output data division step divides output data. The first divided output data transmission step transmits to the network device any of divided output data divided in the output data division step. The collated information transmission step transmits, to the network device, collated information that includes at least one of identification information for identifying a user, identification information for identifying the device utilization apparatus, and identification information for identifying the output data. The second divided output data transmission step transmits to the network device all the remaining divided output data out of divided output data divided in the output data division step, in response to an acquisition request from the network device.

With such a configuration, the program is read by the computer, and when the computer executes the process in accordance with the read program, the same operation and effect as in the device utilization apparatus of aspect 18 can be obtained.

[Aspect 36] An output request program of aspect 36 of the invention is according to aspect 35, further including a program for allowing a computer to execute a process that has a transmission procedure determination step and a transmission procedure information transmission step. The transmission procedure determination step, having a plurality of transmission procedures for transmitting the divided output data, determines any one of the plurality of transmission procedures. The transmission procedure information transmission step transmits, to the network device, transmission procedure information indicative of a transmission procedure determined in the transmission procedure determination step. In this case, the second divided output data transmission step transmits the divided output data in accordance with a transmission procedure determined in the transmission procedure determination step.

With such a configuration, the program is read by the computer, and when the computer executes the process in accordance with the read program, the same operation and effect as in the device utilization apparatus of aspect 19 can be obtained.

[Aspect 37] An output request program of aspect 37 of the invention is according to aspect 35, further including a program for allowing a computer to execute a process that has a second divided output data save step of saving all the remaining divided output data out of divided output data divided in the output data division step and the collated information, into a second divided output data storage unit, in their corresponding relationship. In this case, the second divided output data transmission step, when receiving collation information together with the acquisition request, then based on received collation information, retrieves the collated information corresponding thereto from within the second divided output data storage unit, and transmits divided output data corresponding to collated information located by the retrieval.

With such a configuration, the program is read by the computer, and when the computer executes the process in accordance with the read program, the same operation and effect as in the device utilization apparatus of aspect 20 can be obtained.

[Aspect 38] An output request program of aspect 38 of the invention is according to aspect 35, further including a program for allowing a computer to execute a process that has a division procedure determination step and a division procedure information transmission step. The division procedure determination step, having a plurality of division procedures for dividing the output data, determines any one of the plurality of division procedures. The division procedure information transmission step transmits, to the network device, division procedure information indicative of a division procedure determined in the division procedure determination step. In this case, the output data division step divides the output data in accordance with a division procedure determined in the division procedure determination step.

With such a configuration, the program is read by the computer, and when the computer executes the process in accordance with the read program, the same operation and effect as in the device utilization apparatus of aspect 21 can be obtained.

[Aspect 39] An output request program of aspect 39 of the invention is according to aspect 35, wherein the output data includes output setting information on output setting and content data configuring output content. In this case, the output data division step divides the output data into two: first divided output data including the output setting information and second divided output data including the content data. The first divided output data transmission step transmits first divided output data divided in the output data division step. The second divided output data transmission step transmits second divided output data divided in the output data division step.

With such a configuration, the program is read by the computer, and when the computer executes the process in accordance with the read program, the same operation and effect as in the device utilization apparatus of aspect 22 can be obtained.

[Aspect 40] An output request program of aspect 40 of the invention is according to aspect 35, wherein the output data includes output setting information on output setting and content data configuring output content. In this case, the output data division step divides the output data into two: first divided output data including the output setting information and part of the content data, and second divided output data including the remaining portion of the content data. The first divided output data transmission step transmits first divided output data divided in the output data division step. The second divided output data transmission step transmits second divided output data divided in the output data division step.

With such a configuration, the program is read by the computer, and when the computer executes the process in accordance with the read program, the same operation and effect as in the device utilization apparatus of aspect 23 can be obtained.

[Aspect 41] An output request program of aspect 41 of the invention is according to aspect 39, wherein the output data division step divides the output data in a division form in which at least two of the divided output data are required for the output data configuration step to configure one of the output data.

With such a configuration, the program is read by the computer, and when the computer executes the process in accordance with the read program, the same operation and effect as in the device utilization apparatus of aspect 24 can be obtained.

[Aspect 42] An output request program of aspect 42 of the invention is according to aspect 39, wherein, when the output data is classified in units of a predetermined data length, the output data division step divides specified bit data of the predetermined data length data from the output data to provide the first divided output data, and divides all bit data of the predetermined data length data other than the specified bit data from the output data to provide the second divided output data.

With such a configuration, the program is read by the computer, and when the computer executes the process in accordance with the read program, the same operation and effect as in the device utilization apparatus of aspect 25 can be obtained.

[Aspect 43] An output request program of aspect 43 of the invention is according to aspect 41, wherein, when the output data is classified in units of a predetermined data length, the output data division step divides predetermined order data of the output data in units of the predetermined data length from the output data to provide the first divided output data, and divides data of the output data other than the predetermined order data from the output data to provide the second divided output data.

With such a configuration, the program is read by the computer, and when the computer executes the process in accordance with the read program, the same operation and effect as in the device utilization apparatus of aspect 26 can be obtained.

[Aspect 44] An output request program of aspect 44 is according to aspect 35, wherein the second divided output data transmission step transmits the divided output data through a TCP/IP.

With such a configuration, the program is read by the computer, and when the computer executes the process in accordance with the read program, the same operation and effect as in the device utilization apparatus of aspect 27 can be obtained.

[Aspect 45] To achieve the aforesaid advantage, an output data management program of aspect 45 of the invention that manages part of output data, includes a program for allowing a computer to execute a process that has a divided output data reception step, a divided output data save step, a collation information acquisition step, and a divided output data transmission step. The divided output data reception step receives divided output data obtained by dividing the output data. The divided output data save step saves divided output data received in the divided output data reception step, into a divided output data storage unit. The collation information acquisition step acquires collation information that includes at least one of identification information for identifying a user, identification information for identifying a device utilization apparatus, and identification information for identifying the output data. The divided output data transmission step transmits, to the network device, collation information acquired in the collation information acquisition step and divided output data in the divided output data storage unit.

With such a configuration, the program is read by the computer, and when the computer executes the process in accordance with the read program, the same operation and effect as in the device utilization apparatus of aspect 28 can be obtained.

[Aspect 46] To achieve the aforesaid advantage, an authentication output method of aspect 46 of the invention in which a network device that performs an output based on output data and a device utilization apparatus that utilizes the network device are communicably connected to each other, and in which the network device performs the output through authentication, includes: for the device utilization apparatus, an output data division step, a first divided output data transmission step, and a collated information transmission step; for the network device, a divided output data reception step, a collated information reception step, a divided output data save step, a collation information acquisition step, and a divided output data acquisition step; for the device utilization apparatus, a second divided output data transmission step; and for the network device, an output data configuration step and an output step. In the device utilization apparatus, the output data division step divides the output data. The first divided output data transmission step transmits to the network device any of divided output data divided in the output data division step. The collated information transmission step transmits, to the network device, collated information that includes at least one of identification information for identifying a user, identification information for identifying the device utilization apparatus, and identification information for identifying the output data. In the network device, the divided output data reception step receives divided output data transmitted in the first divided output data transmission step. The collated information reception step receives collated information transmitted in the collated information transmission step. The divided output data save step saves divided output data received in the divided output data reception step and collated information received in the collated information reception step, into a divided output data storage unit, in their corresponding relationship. The collation information acquisition step acquires collation information including the identification information. The divided output data acquisition step, when determining eligibility to use the output data based on collation information acquired by the collation information acquisition unit and on collated information in the divided output data storage unit, acquires all the remaining divided output data out of the divided output data, from the device utilization apparatus. In the device utilization apparatus, the second divided output data transmission step transmits to the network device all the remaining divided output data out of divided output data divided in the output data division step, in response to an acquisition request from the network device. Besides, in the network device, the output data configuration step configures the output data based on divided output data acquired in the divided output data acquisition step and on corresponding divided output data in the divided output data storage unit. The output step performs the output based on output data configured in the output data configuration step.

Thereby, the same effect as in the authentication output system of aspect 1 can be obtained.

[Aspect 47] An authentication output method of aspect 47 of the invention is according to aspect 46, further including: for the device utilization apparatus, a transmission procedure determination step and a transmission procedure information transmission step; and for the network device, a transmission procedure information reception step. In the device utilization apparatus, the transmission procedure determination step, having a plurality of transmission procedures for transmitting the divided output data, determines any one of the plurality of transmission procedures. The transmission procedure information transmission step transmits, to the network device, transmission procedure information indicative of a transmission procedure determined in the transmission procedure determination step. Besides, in the network device, the transmission procedure information reception step receives transmission procedure information indicative of a transmission procedure for transmitting the divided output data. In this case, the divided output data save step saves the divided output data, the collated information, and transmission procedure information received in the transmission procedure information reception step, into the divided output data storage unit, in their corresponding relationship. The divided output data acquisition step, based on the collation information, retrieves the collated information corresponding thereto from within the divided output data storage unit, and acquires the divided output data based on transmission procedure information corresponding to collated information located by the retrieval. The second divided output data transmission step transmits the divided output data in accordance with a transmission procedure determined in the transmission procedure determination step.

Thereby, the same effect as in the authentication output system of aspect 2 can be obtained.

[Aspect 48] An authentication output method of aspect 48 of the invention is according to aspect 46, further including, for device utilization apparatus, a second divided output data save step of saving all the remaining divided output data out of divided output data divided in the output data division step and the collated information, into a second divided output data storage unit, in their corresponding relationship. In this case, the divided output data acquisition step, based on the collation information, retrieves the collated information corresponding thereto from within the divided output data storage unit, and when locating the corresponding collated information by the retrieval, transmits the collation information to the device utilization apparatus together with the acquisition request. When receiving collation information together with the acquisition request, the second divided output data transmission step, based on received collation information, retrieves the collated information corresponding thereto from within the second divided output data storage unit, and transmits divided output data corresponding to collated information located by the retrieval.

Thereby, the same effect as in the authentication output system of aspect 3 can be obtained.

[Aspect 49] An authentication output method of aspect 49 is according to aspect 46, further including: for the device utilization apparatus, a division procedure determination step and a division procedure information transmission step; and for the network device, a transmission procedure information reception step. In the device utilization apparatus, the division procedure determination step, having a plurality of division procedures for dividing the output data, determines any one of the plurality of division procedures. The division procedure information transmission step transmits, to the network device, division procedure information indicative of a division procedure determined in the division procedure determination step. Besides, in the network device, the transmission procedure information reception step receives transmission procedure information indicative of a transmission procedure for transmitting the divided output data. In this case, the divided output data save step saves the divided output data, the collated information, and transmission procedure information received in the transmission procedure information reception step, into the divided output data storage unit, in their corresponding relationship. The output data division step divides the output data in accordance with a division procedure determined in the division procedure determination step. The output data configuration step configures the output data based on divided output data acquired in the divided output data acquisition step, on corresponding divided output data in the divided output data storage unit, and on division procedure information.

Thereby, the same effect as in the authentication output system of aspect 4 can be obtained.

[Aspect 50] An authentication output method of aspect 50 is according to aspect 46, wherein the output data includes output setting information on output setting and content data configuring output content. In this case, the output data division step divides the output data into two: first divided output data including the output setting information and second divided output data including the content data. The first divided output data transmission step transmits first divided output data divided in the output data division step. The second divided output data transmission step transmits second divided output data divided in the output data division step.

Thereby, the same effect as in the authentication output system of aspect 5 can be obtained.

[Aspect 51] An authentication output system of aspect 51 is according to aspect 46, wherein the output data includes output setting information on output setting and content data configuring output content. In this case, the output data division step divides the output data into two: first divided output data including the output setting information and part of the content data, and second divided output data including the remaining portion of the content data. The first divided output data transmission step transmits first divided output data divided in the output data division step. The second divided output data transmission step transmits second divided output data divided in the output data division step.

Thereby, the same effect as in the authentication output system of aspect 6 can be obtained.

[Aspect 52] An authentication output method of aspect 52 is according to aspect 50, wherein the output data division step divides the output data in a division form in which at least two of the divided output data are required for the output data configuration step to configure one of the output data.

Thereby, the same effect as in the authentication output system of aspect 7 can be obtained.

[Aspect 53] An authentication output method of aspect 53 is according to aspect 50, wherein, when the output data is classified in units of a predetermined data length, the output data division step divides specified bit data of the predetermined data length data from the output data to provide the first divided output data, and divides all bit data of the predetermined data length data other than the specified bit data from the output data to provide the second divided output data.

Thereby, the same effect as in the authentication output system of aspect 8 can be obtained.

[Aspect 54] An authentication output method of aspect 54 is according to aspect 52, wherein, when the output data is classified in units of a predetermined data length, the output data division step divides predetermined order data of the output data in units of the predetermined data length from the output data to provide the first divided output data, and divides data of the output data other than the predetermined order data from the output data to provide the second divided output data.

Thereby, the same effect as in the authentication output system of aspect 9 can be obtained.

[Aspect 55] An authentication output method of aspect 55 of the invention is according to aspect 46, wherein the second divided output data transmission step transmits the divided output data through a TCP/IP.

Thereby, the same effect as in the authentication output system of aspect 10 can be obtained.

[Aspect 56] An authentication output method of aspect 56 of the invention in which a network device that performs an output based on output data and a device utilization apparatus that utilizes the network device are communicably connected to each other, and in which the network device performs the output through authentication, includes: for the network device, an output data division step, an output data division step, and a first divided output data save step; for the output data management apparatus, a second divided output data reception step, a second divided output data save step, a collation information acquisition step, and a second divided output data transmission step; and for the network device, a first divided output data reception step, an output data configuration step, and an output step. In the network device, the output data division step divides the output data. The first divided output data transmission step transmits to the output data management apparatus any of divided output data divided in the output data division step. The first divided output data save step saves all the remaining divided output data out of divided output data divided in the output data division step, into a first divided output data storage unit, in corresponding relationship with collated information that includes at least one of identification information for identifying a user, identification information for identifying a device utilization apparatus, and identification information for identifying the output data. In the output data management apparatus, the second divided output data reception step receives divided output data transmitted in the first divided output data transmission step. The second divided output data save step saves divided output data received in the second divided output data reception step, into a second divided output data storage unit. The collation information acquisition step acquires collation information including the identification information. The second divided output data transmission step transmits, to the network device, collation information acquired in the collation information acquisition step and divided output data in the second divided output data storage unit. Besides, in the network device, the first divided output data reception step receives the collation information and the divided output data. The output data configuration step, when determining eligibility to use the output data based on collation information received in the first divided output data reception step and on collated information in the first divided output data storage unit, configures the output data based on divided output data received in the first divided output data reception step and on corresponding divided output data in the first divided output data storage unit. The output step performs the output based on output data configured in the output data configuration step.

Thereby, the same effect as in the authentication output system of aspect 1 can be obtained.

BRIEF DESCRIPTION OF THE DRAWINGS

The invention will be described with reference to the accompanying drawings, wherein like numbers reference like elements, and wherein:

FIG. 7 is a chart showing the classification of division procedure identifiers;

FIG. 9 is a diagram showing the data structure of job management information;

FIGS. 10A and 10B are diagrams showing the data structures of first divided print data and second divided print data which are configured in steps S260 and S262, respectively;

FIGS. 11A and 11B are diagrams showing the data structures of first divided print data and second divided print data which are configured in steps S266 and S268, respectively;

DESCRIPTION OF THE EMBODIMENTS

A first embodiment of the invention will be described with reference to the drawings. FIGS. 1 to 16 are diagrams showing the first embodiment of an authentication output system, network device, device utilization apparatus, output control program, output request program, and authentication output method of the invention.

Figure 1:
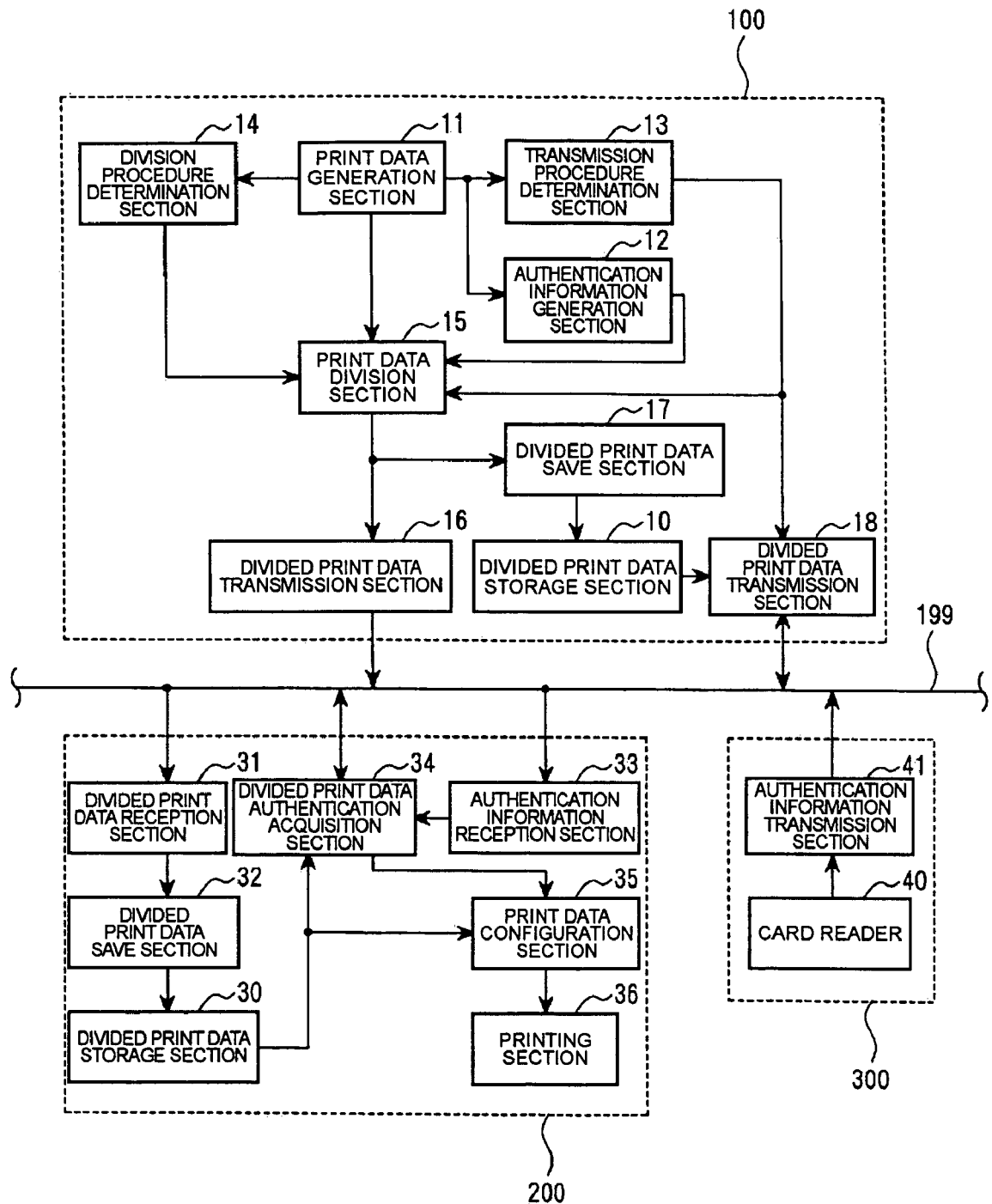
FIG. 1 is a functional block diagram showing the functional outline of a network system.

In this embodiment, as shown in FIG. 1, the authentication output system, network device, device utilization apparatus, output control program, output request program, and authentication output method of the invention are applied to using an authentication card to perform printing on a network printer 200.

The functional outline of a network system to which the invention is applied will first be described with reference to FIG. 1.

FIG. 1 is a functional block diagram showing the functional outline of the network system.

As shown in FIG. 1, a host terminal 100, the network printer 200, and a user authentication apparatus 300 are connected to a network 199.

The host terminal 100 has a divided print data storage section 10, a print data generation section 11, an authentication information generation section 12, a transmission procedure determination section 13, and a division procedure determination section 14. The print data generation section 11 generates print data. The authentication information generation section 12 generates authentication information that includes user information, host terminal information, and a job ID. The transmission procedure determination section 13 determines any one of a plurality of different transmission procedures for transmitting divided print data obtained by dividing the print data. The division procedure determination section 14 determines any one of a plurality of different division procedures for dividing the print data.

The authentication information generation section 12, transmission procedure determination section 13, and division procedure determination section 14 execute with the timing of the print data being generated by the print data generation section 11.

The host terminal 100 further has a print data division section 15, a divided print data transmission section 16, and a divided print data save section 17. The print data division section 15 divides the print data into two: first divided print data and second divided print data. The divided print data transmission section 16 transmits the first divided print data to the network printer 200 together with a first print request. The divided print data save section 17 saves the second divided print data into the divided print data storage section 10.

The print data division section 15 divides the print data in accordance with a division procedure determined by the division procedure determination section 14. The print data division section 15 adds, to the first divided print data, job management information that includes: the authentication information generated by the authentication information generation section 12; a transmission procedure identifier indicative of the transmission procedure determined by the transmission procedure determination section 13; and a division procedure identifier indicative of the division procedure determined by the division procedure determination section 14.

The host terminal 100 further has a divided print data transmission section 18. In response to an acquisition request from the network printer 200, the divided print data transmission section 18 transmits the second divided print data in the divided print data storage section 10 to the network printer 200 in accordance with the transmission procedure determined by the transmission procedure determination section 13.

The network printer 200 has a divided print data storage section 30, a divided print data reception section 31, and a divided print data save section 32. The divided print data reception section 31 receives the first divided print data together with the first print request. The divided print data save section 32 saves into the divided print data storage section 30 the first divided print data received by the divided print data reception section 31.

The divided print data save section 32 extracts the job management information from the first divided print data, and saves the first divided print data into the divided print data storage section 30 in corresponding relationship with the job management information.

The network printer 200 further has an authentication information reception section 33, a divided print data authentication acquisition section 34, a print data configuration section 35, and a printing section 36. The authentication information reception section 33 receives the authentication information together with a second print request. The divided print data authentication acquisition section 34 acquires the second divided print data from the host terminal 100, when determining eligibility to use the print data based on the authentication information received by the authentication information reception section 33 and on the job management information in the divided print data storage section 30. The print data configuration section 35 configures the print data based on the second divided print data acquired by the divided print data authentication acquisition section 34 and on the corresponding first divided print data in the divided print data storage section 30. The printing section 36 performs printing based on the print data configured by the print data configuration section 35.

The divided print data authentication acquisition section 34 retrieves appropriate job management information from within the divided print data storage section 30, based on the authentication information. When locating the appropriate job management information, the divided print data authentication acquisition section 34 determines the eligibility to use the print data, and thus acquires the second divided print data based on the transmission procedure identifier included in the located job management information.

The print data configuration section 35 configures print data from the first and second divided print data, based on the division procedure identifier included in the job management information located by the divided print data authentication acquisition section 34.

The user authentication apparatus 300, disposed in proximity to the network printer 200, has a card reader 40 and an authentication information transmission section 41. The card reader 40 reads the authentication information from the authentication card made up of an IC card, etc. The authentication information transmission section 41 transmits the authentication information read by the card reader 40, to the network printer 200, together with the second print request.

The configuration of the host terminal 100 will now be described.

Figures 2, 3:
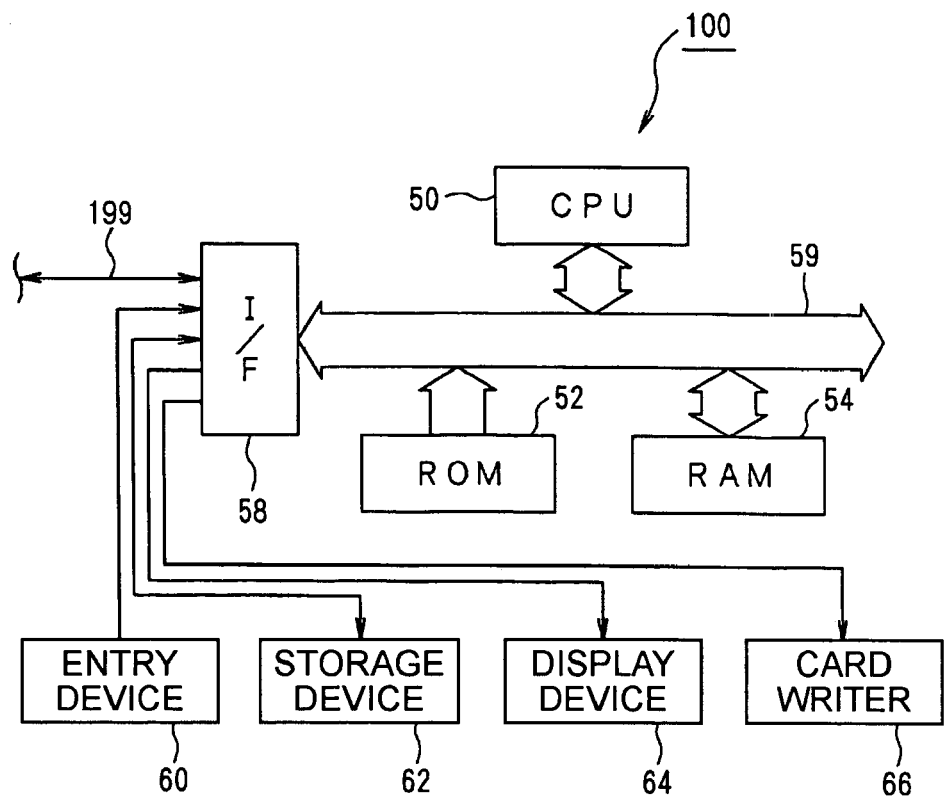
FIG. 2 is a block diagram showing the hardware configuration of a host terminal.
FIG. 3 is a diagram showing the data structure of a use history table.

FIG. 2 is a block diagram showing the hardware configuration of the host terminal 100.

As shown in FIG. 2, the host terminal 100 has a CPU 50, a ROM 52, a RAM 54, and an I/F 58 which are connected to each other, so as to be capable of exchanging data with each other, by a bus 59 that is a signal line for transferring data. The CPU 50 makes a calculation and controls the entire system, based on a control program. The ROM 52 pre-stores the control program, etc. of the CPU 50 in predetermined regions. The RAM 54 stores data read from the ROM 52, etc. and a calculation result necessary in the process of calculation by the CPU 50. The I/F 58 mediates the output and input of data from external devices.

An entry device 60, a storage device 62, a display device 64, a card writer 66, and a signal line are connected as the external devices to the I/F 58. The entry device 60 is made up of a keyboard, a mouse, etc. which are capable of data entry as a human interface. The storage device 62 stores data, a table, etc. as files. The display device 64 displays a screen based on an image signal. The card writer 66 writes the authentication information, into the authentication card inserted therein. The signal line is connected to the network 199.

The storage device 62 configures the divided print data storage section 10. Besides, the storage device 62 stores a use history table 400 into which to register the use histories of the transmission procedure and division procedure.

FIG. 3 is a diagram showing the data structure of the use history table 400.

As shown in FIG. 3, the use history table 400 has one record registered therein for each print job on printing standby. Each record includes a field 402 into which to register the job ID allocated to the print job, a field 404 into which to register the transmission procedure identifier, and a field 406 into which to register the division procedure identifier.

In the example of FIG. 3, a first-row record has registered therein "2334" as the job ID, "19300" as the transmission procedure identifier, and "2" as the division procedure identifier. This indicates that a print job 2334 (which refers to the print job allocated with the job ID "2334". The similar abbreviation will hereinafter be applied to the other print jobs.) is on standby, and that a transmission procedure corresponding to the transmission procedure identifier "19300" and a division procedure corresponding to the division procedure identifier "2" are used as the transmission and division procedures of print data relating to the print job 2334. The detailed content of the transmission and division procedures will be described later.

Figure 4:
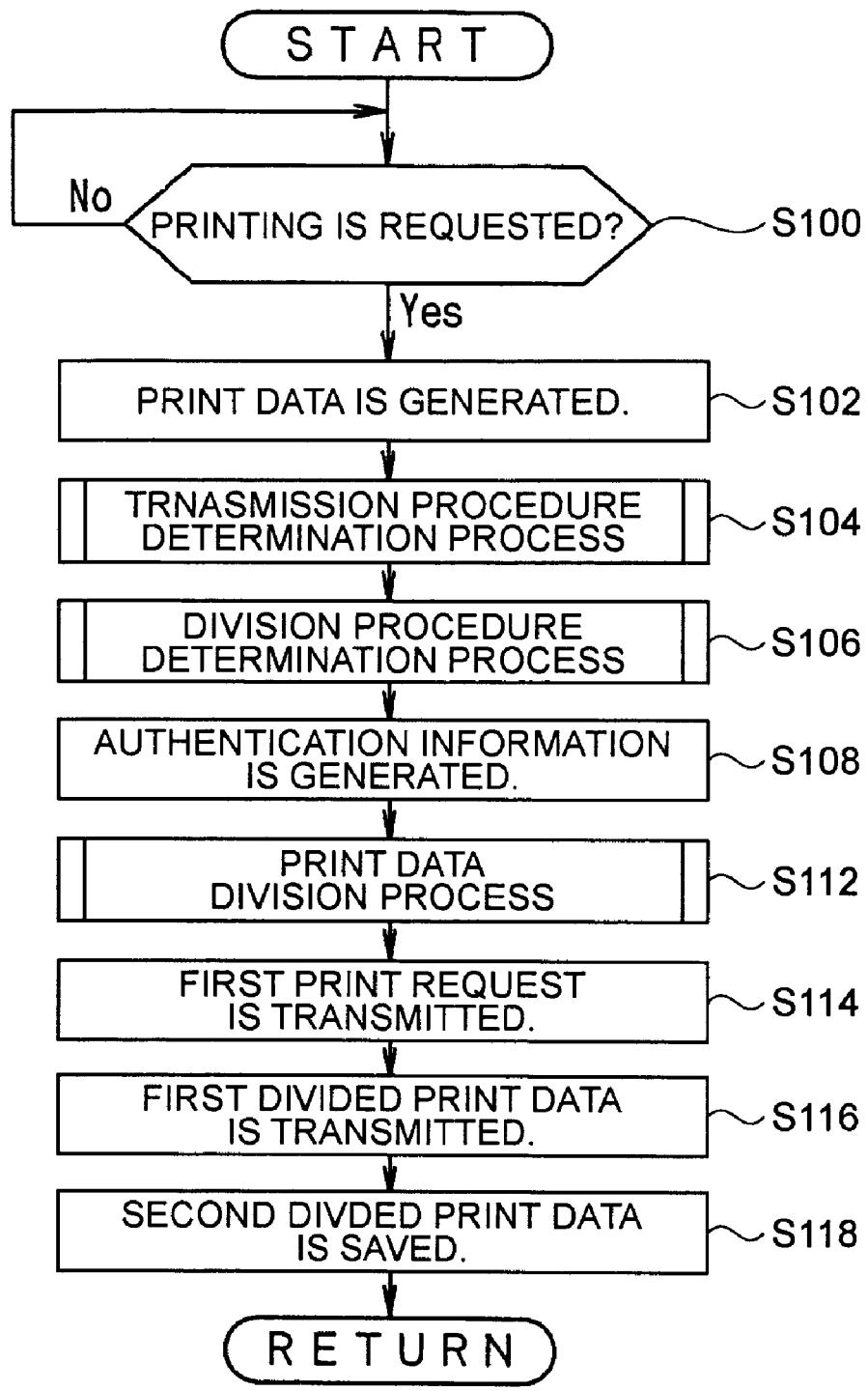
FIG. 4 is a flowchart showing a print request process.
Figure 12:
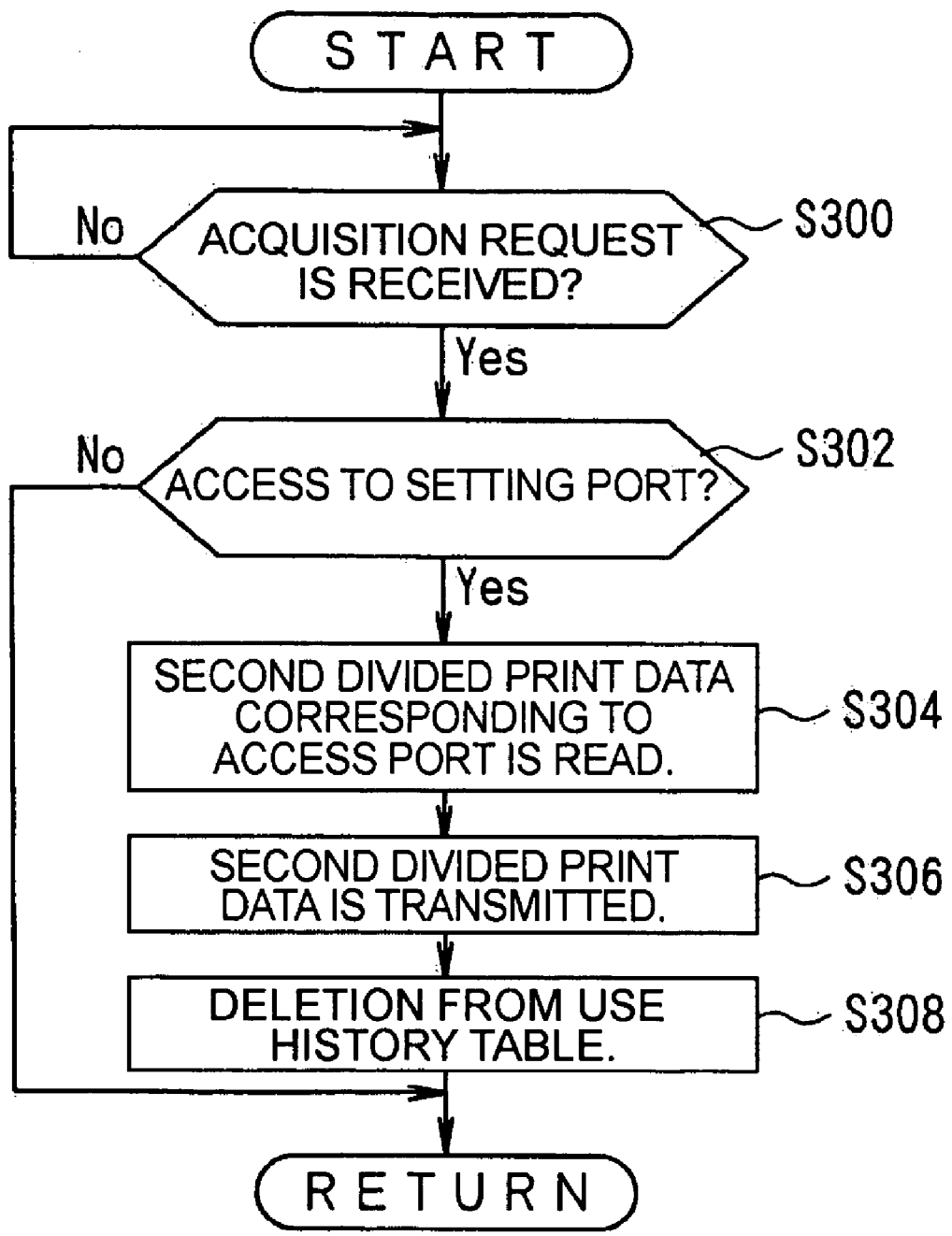
FIG. 12 is a flowchart showing a divided print data transmission process.

The CPU 50, made up of a micro-processing unit, etc., is configured to start a predetermined program stored in the predetermined region of the ROM 52 to execute a print request process and a divided print data transmission process, as shown in the flowcharts of FIGS. 4 and 12, respectively, in a time-division manner in accordance with the program.

The print request process will first be described in detail with reference to FIG. 4.

FIG. 4 is a flowchart showing the print request process.

The print request process, which is the process of making a request of the network printer 200 for printing, is configured to move first to step S100, as shown in FIG. 4, when executed by the CPU 50.

In step S100, it is determined whether or not printing is requested from a document creation application, etc. If it is determined that printing is requested (Yes), the process moves to step S102, but if not (No), the process waits in step S100 until printing is requested.

In step S102, the job ID is issued and the print data is created. The print data is made up of print setting information on print setting and image data configuring print content.

Subsequently, the process moves to step S104 to execute a transmission procedure determination process for determining any one of the plurality of different transmission procedures. The process moves to step S106 to execute a division procedure determination process for determining any one of the plurality of different division procedures, and then moves to step S108.

In step S108, the user information of a user who currently uses the host terminal 100 and the host terminal information of the host terminal 100 are acquired to generate the authentication information that includes the issued job ID, the acquired user information, and host terminal information. The process moves to step S112 to execute a print data division process for dividing the generated print data into two, and then moves to step S114.

In step S114, the first print request is transmitted to the network printer 200. The process moves to step S116 to transmit to the network printer 200 the first divided print data divided in the print data division process. Then, the process moves to step S118 to save into the storage device 62 the second divided print data divided in the print data division process. Thus, the process ends its series of steps and is restored to the original step.

The transmission procedure determination process in step S104 will now be described in detail with reference to FIG. 5.

Figure 5:
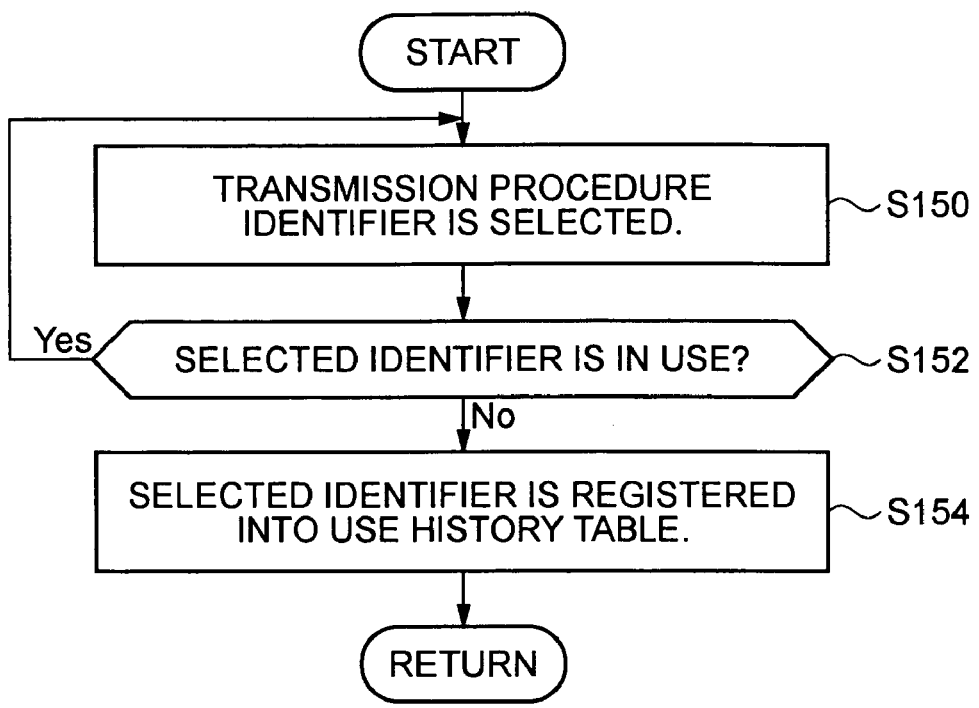
FIG. 5 is a flowchart showing a transmission procedure determination process.

FIG. 5 is a flowchart showing the transmission procedure determination process.

The transmission procedure determination process is configured to move first to step S150, as shown in FIG. 5, when executed in step S104.

In step S150, any one identifier is randomly selected from a plurality of different transmission procedure identifiers. Each transmission procedure identifier is a port number of a TCP/IP used for communication with the network printer 200. That is, any one port number is selected from among the port numbers in a predetermined range reserved for communication with the network printer 200.

Subsequently, the process moves to step S152 to determine whether or not the selected transmission procedure identifier is used by another print job on standby, with reference to the use history table 400. If it is determined that the selected transmission procedure identifier is not used (No), the process moves to step S154 to register the selected transmission procedure identifier into the use history table 400 in corresponding relationship with the job ID issued in step S102. Thus, the process ends its series of steps and is restored to the original step.

On the contrary, if it is determined in step S152 that the selected transmission procedure identifier is used by another print job on standby (Yes), the process moves to step S150.

The division procedure determination process in step S106 will now be described in detail with reference to FIG. 6.

Figure 6:
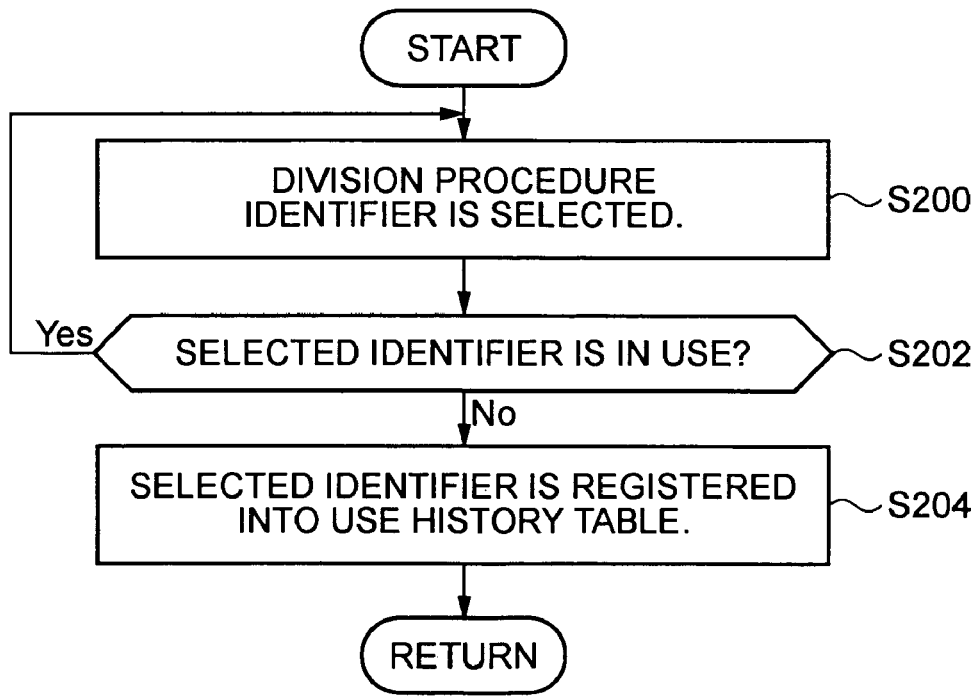
FIG. 6 is a flowchart showing a division procedure determination process.

FIG. 6 is a flowchart showing the division procedure determination process.

The division procedure determination process is configured to move first to step S200, as shown in FIG. 6, when executed in step S106.

In step S200, any one division procedure identifier is randomly selected from among a plurality of different division procedure identifiers.

FIG. 7 is a chart showing the classification of the division procedure identifiers.

As shown in FIG. 7, the division procedure identifiers are numbers for specifying which of a plurality of data division processes to be used to divide the print data. In the example of FIG. 7, the division procedure identifier "1" corresponds to the process in which the print setting information out of the print data is divided to provide the first divided print data, and the image data out of the print data is divided to provide the second divided print data. The division procedure identifiers "2" to "5" are the processes in which part of the print setting information and image data is divided to provide the first divided print data and the remaining portion of the image data is divided to provide the second divided print data, corresponding to the processes that have different image data division procedures from each other. For example, the division procedure identifier "2" corresponds to the process in which data are extracted for every 1000 bits beginning with the top of the image data, wherein the top 5 bit data out of the extracted data are configured as the first divided print data, and the remaining 995 bit data are configured as the second divided print data.

Additionally, the example of FIG. 7 illustrates only five division procedures, but a larger number of division procedures are defined, thereby enabling a further improvement in security.

Subsequently, the process moves to step S202 to determine whether the selected division procedure identifier is used or not by another print job on standby, with reference to the use history table 400. If it is determined that the selected division identifier is not used (No), the process moves to step S204 to register the selected division procedure identifier into the use history table 400 in corresponding relationship with the job ID issued in step S102. Thus, the process ends its series of steps and is restored to the original step.

On the contrary, if it is determined in step S202 that the selected division procedure identifier is used by another print job on standby (Yes), the process moves to step S200.

The print data division process in step S112 will now be described in detail with reference to FIG. 8.

Figure 8:
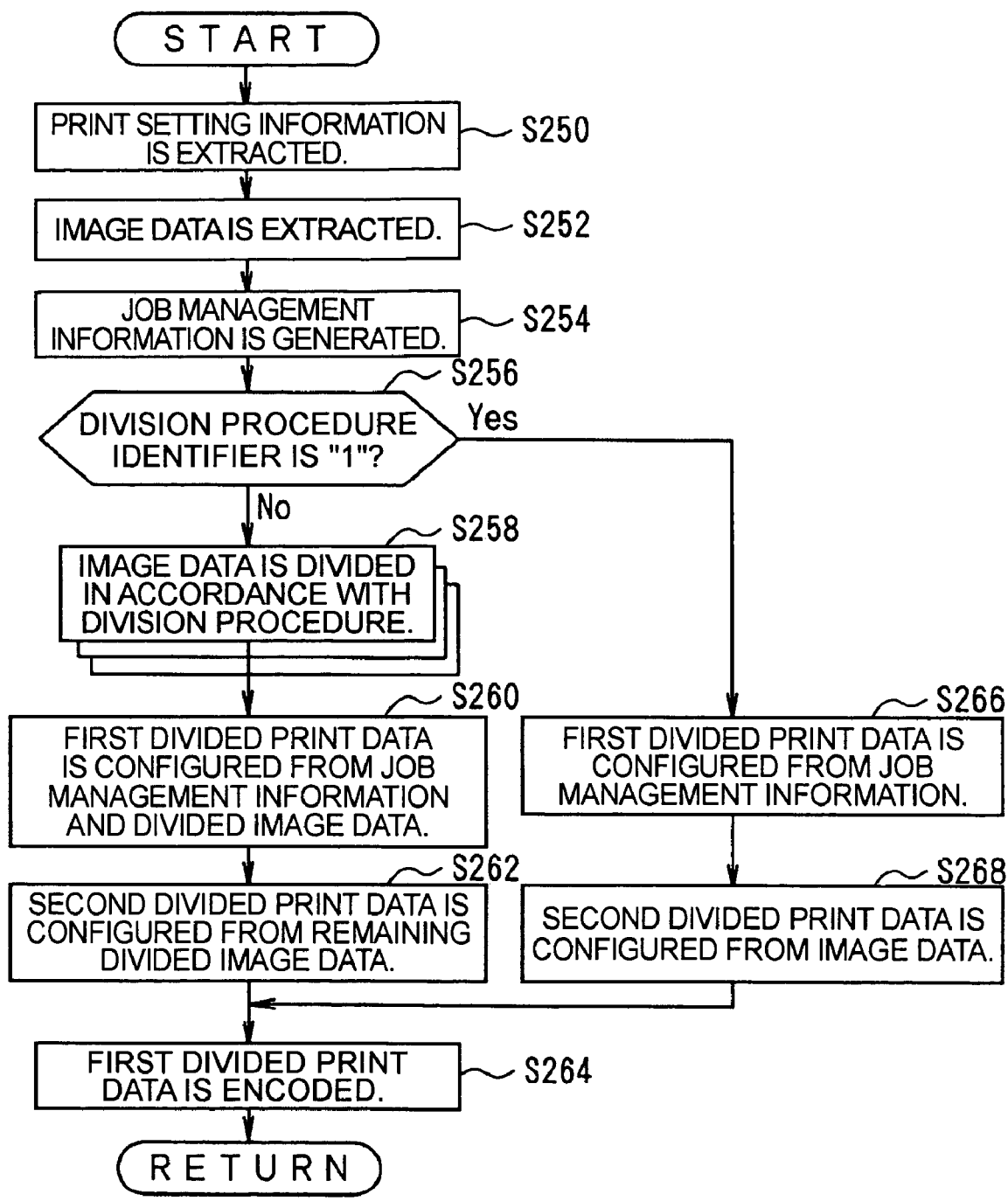
FIG. 8 is a flowchart showing a print data division process.

FIG. 8 is a flowchart showing the print data division process.

The print data division process is configured to move first to step S250, as shown in FIG. 8, when executed in step S112.

In step S250, the print setting information is extracted from the print data generated in step S102. The process moves to step S252 to extract the image data from the generated print data, and then moves to step S254.

Step S254 generates the job management information that includes the authentication information generated in step S108, the transmission and division procedure identifiers selected in steps S150 and S200, and the print setting information extracted in step S250.

FIG. 9 is a diagram showing the data structure of the job management information.

The job management information includes fields 422, 424, 426, 428, 430, 432, 434, 436, and 438. The field 422 stores the job ID, the field 424 stores the date and time on which the print job is generated, the field 426 stores a user name, and the field 428 stores a user ID. The field 430 stores the appellation of the host terminal 100, the field 432 stores the IP address of the host terminal 100, the field 434 stores the transmission procedure identifier, the field 436 stores the division procedure identifier, and the field 438 stores the print setting information. Here, the user name and the user ID configure the user information, and the appellation and IP address of the host terminal 100 configure the host terminal information.

Subsequently, the process moves to step S256 to determine whether the selected division procedure identifier is "1" or not. If it is determined that the division procedure identifier is not "1" (No), the process moves to step S258.

In step S258, the extracted image data is divided into two in accordance with the division procedure corresponding to the selected division procedure identifier. Specifically, an image data division process is prepared for each division procedure identifier, and the image data division process corresponding to the selected division procedure identifier is executed. For example, a first image data division process is executed if the division procedure identifier is "2", while a second image data division process is executed if the division procedure identifier is "3". The typical image data division process is configured such that data are extracted in units of a predetermined data length beginning with the top of the image data, wherein, out of the extracted data, data of specified bits are configured as first divided image data, and data of bits other than the specified bits are configured as second divided image data.

Subsequently, the process moves to step S260, wherein the generated job management information and the divided first divided image data are configured as the first divided print data. The process moves to step S262, wherein the divided second divided image data is configured as the second divided print data.

FIGS. 10A and 10B are diagrams showing the data structures of the first and second divided print data configured in steps S260 and S262, respectively.

As shown in FIG. 10A, the first divided print data is configured by adding binary data of the first divided image data to the job management information including the fields 422 to 438. Besides, as shown in FIG. 10B, the second divided print data is configured as binary data of the second divided image data.

Subsequently, the process moves to step S264 to encode the first divided print data based on a predetermined encryption algorithm. Thus, the process ends its series of steps and is restored to the original step.

On the contrary, if it is determined in step S256 that the selected division procedure identifier is "1" (Yes), the process moves to step S266, wherein the generated job management information is configured as the first divided print data. The process moves to step S268, wherein the extracted image data is configured as the second divided print data, and then moves to step S264.

FIGS. 11A and 11B are diagrams showing the data structures of the first and second divided print data configured in steps S266 and S268, respectively.

As shown in FIG. 11A, the first divided print data is configured as the job management information including the fields 422 to 438. Besides, as shown in FIG. 11B, the second divided print data is configured as binary data of the image data.

The divided print data transmission process will now be described in detail with reference to FIG. 12.

FIG. 12 is a flowchart showing the divided print data transmission process.

The divided print data transmission process, which is the process of transmitting the second divided print data to the network printer 200 in response to the acquisition request from the network printer 200, is configured to move first to step S300, as shown in FIG. 12, when executed by the CPU 50.

In step S300, it is determined whether the acquisition request is received or not. If it is determined that the acquisition request is received (Yes), the process moves to step S302, but if not (No), the process waits in step S300 until the acquisition request is received.

In step S302, it is determined whether or not the received acquisition request is an access to a setting port (which refers to the port of any transmission procedure identifier registered in the use history table 400), with reference to the use history table 400. If it is determined to be the access to the setting port (Yes), the process moves to step S304.

In step S304, the second divided print data corresponding to the port accessed is read from the storage device 62, with reference to the use history table 400. The process moves to step S306 to transmit the read second divided print data to the network printer 200. Then, the process moves to step S308, wherein the record having registered therein the transmission procedure identifier corresponding to the port accessed is deleted from the use history table 400. Thus, the process ends its series of steps and is restored to the original step.

On the contrary, if it is determined in step S302 that the received acquisition request is not the access to the setting port (No), the process ends its series of steps and is restored to the original step. That is, if an acquisition request is received from a port other than the setting port, such an access is refused. Technology for thus controlling an access can use, for example, packet filtering.

The configuration of the network printer 200 will now be described.

Figure 13:
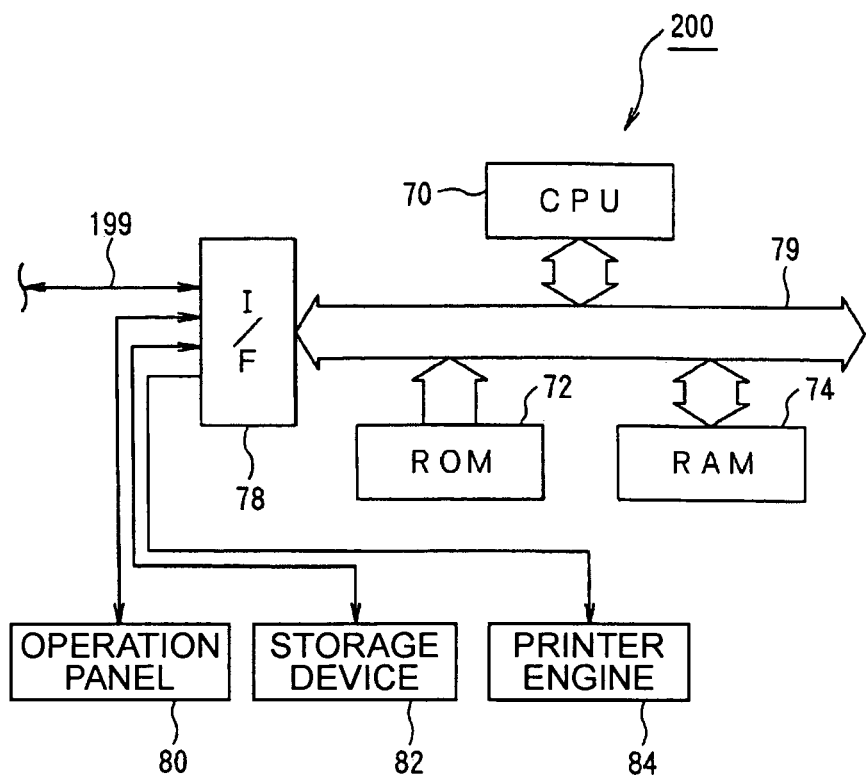
FIG. 13 is a block diagram showing the hardware configuration of a network printer.

FIG. 13 is a block diagram showing the hardware configuration of the network printer 200.

As shown in FIG. 13, the network printer 200 includes a CPU 70, a ROM 72, a RAM 74, and an I/F 78 which are connected to each other, so as to be capable of exchanging data with each other, by a bus 79 that is a signal line for transferring data. The CPU 70 makes a calculation and controls the entire system, based on a control program. The ROM 72 pre-stores the control program, etc. of the CPU 70 in predetermined regions. The RAM 74 stores data read from the ROM 72, etc. and a calculation result necessary in the process of calculation by the CPU 70. The I/F 78 mediates the output and input of data from external devices.

An operation panel 80, a storage device 82, a printer engine 84, and a signal line are connected as the external devices to the I/F 78. The operation penal 80 is made up of a touch panel, etc. which are capable of data entry and display as a human interface. The storage device 82 stores data, a table, etc. as files. The printer engine 84 is made up of a printhead, a head driving section, and other mechanisms necessary for printing. The signal line is connected to the network 199.

The storage device 82 configures the divided print data storage section 30.

Figure 14:
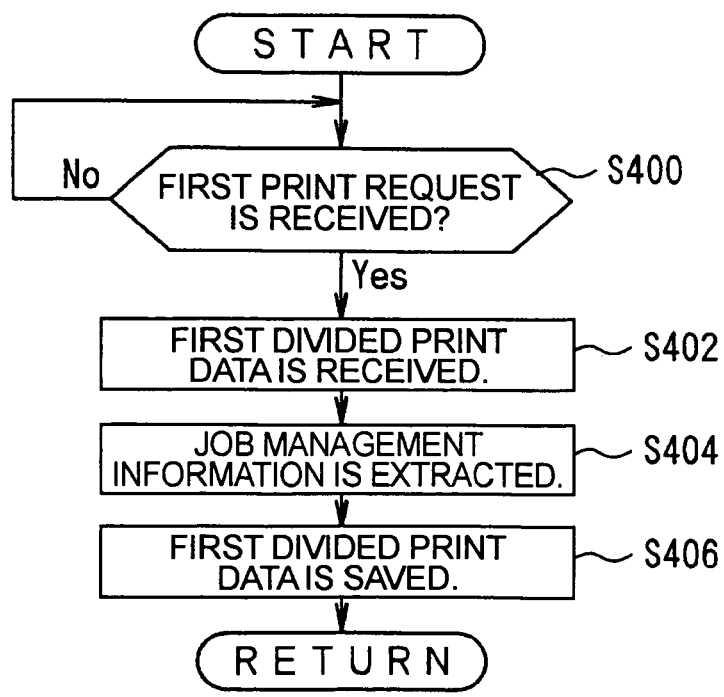
FIG. 14 is a flowchart showing a print request receipt process.
Figure 15:
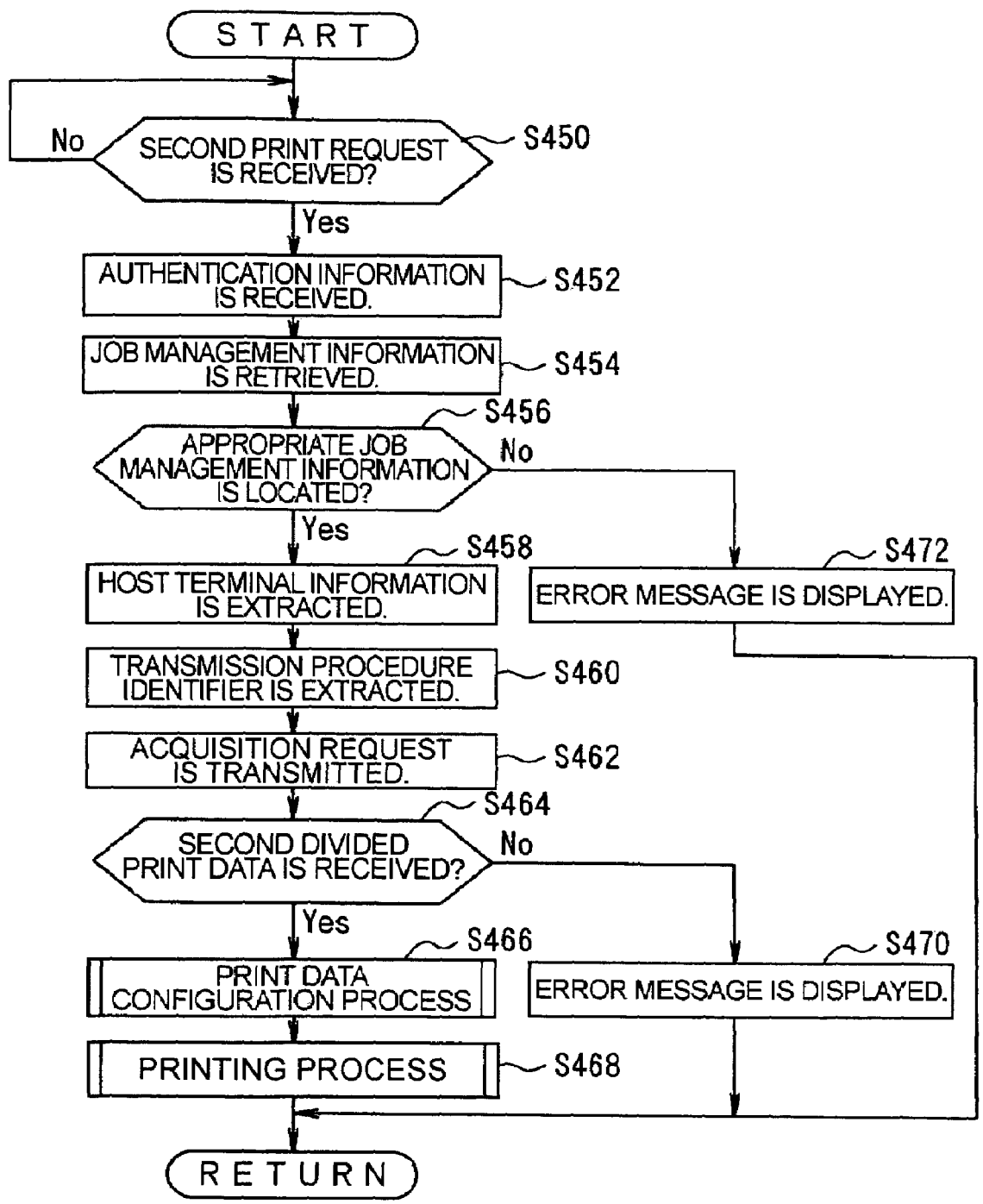
FIG. 15 is a flowchart showing a print control process.

The CPU 70, made up of a micro-processing unit, etc., is configured to start a predetermined program stored in the predetermined region of the ROM 72 to execute a print request receipt process and a print control process, as shown in the flowcharts of FIGS. 14 and 15, respectively, in a time-division manner in accordance with the program.

The print request receipt process will first be described in detail with reference to FIG. 14.

FIG. 14 is a flowchart showing the print request receipt process.

The print request receipt process, which is the process of receiving the first divided print data from the host terminal 100, is configured to move first to step S400, as shown in FIG. 14, when executed by the CPU 70.

In step S400, it is determined whether the first print request is received or not. If it is determined that the first print request is received (Yes), the process moves to step S402, but if not (No), the process waits in step S400 until the first print request is received.

In step S402, the first divided print data is received. The process moves to step S404, wherein the received first divided print data is decoded based on a predetermined decryption algorithm, and the job management information is extracted from the decoded first divided print data. Then, the process moves to step S406, wherein the received first divided print data before decoded is saved into the storage device 82 in corresponding relationship with the extracted job management information. Thus, the process ends its series of steps and is restored to the original step.

The print control process will now be described in detail with reference to FIG. 15.

FIG. 15 is a flowchart showing the print control process.

The print control process, which is the process of performing printing in response to the second print request from the user authentication apparatus 300, is configured to move first to step S450, as shown in FIG. 15, when executed by the CPU 70.

In step S450, it is determined whether the second print request is received or not. If it is determined that the second print request is received (Yes), the process moves to step S452, but if not (No), the process waits in step S450 until the second print request is received.

In step S452, the authentication information that includes the user information, host terminal information, and job ID are received. The process moves to step S454, wherein the job management information including authentication information identical to the received authentication information is retrieved from within the storage device 82. Then, the process moves to step S456 to determine whether the appropriate job management information is located or not. If it is determined that the appropriate job management information is located (Yes), the process moves to step S458.

In step S458, the host terminal information is extracted from the located job management information. The process moves to step S460 to extract the transmission procedure identifier from the located job management information. Then, the process moves to step S462 to transmit the acquisition request to an IP address included in the extracted host terminal information and a port indicated by the transmission procedure identifier, and then moves to step S464.

In step S464, it is determined whether the second divided print data is received or not. If it is determined that the second divided print data is received (Yes), the process moves to step S466 to execute the print data configuration process of configuring print data. The process moves to step S468, wherein printing is performed by the printer engine 84 based on the print data configured in the print data configuration process. Thus, the process ends its series of steps and is restored to the original step.

On the contrary, if it is determined in step S464 that the second divided print data is not received (No), the process moves to step S470, wherein an error message to the effect that the print data cannot be acquired is displayed on the operation panel 80. Thus, the process ends its series of steps and is restored to the original step.

On the other hand, if it is determined in step S456 that the appropriate job management information is not located (No), the process moves to step S472, wherein an error message to the effect that authentication cannot be obtained is displayed on the operation panel 80. Thus, the process ends its series of steps and is restored to the original step.

The print data configuration process in step S466 will now be described in detail with reference to FIG. 16.

Figure 16:
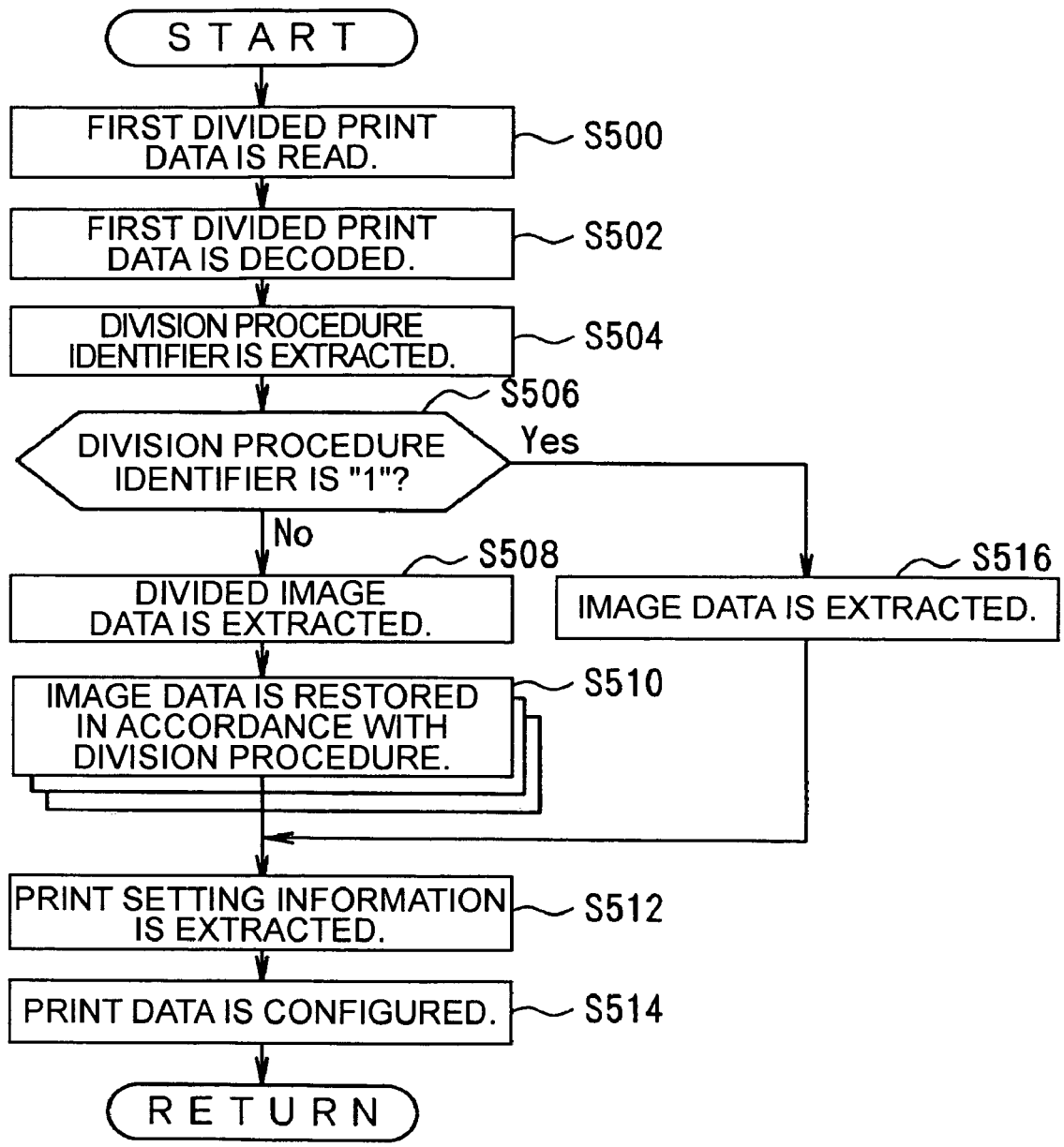
FIG. 16 is a flowchart showing a print data configuration process.

FIG. 16 is a flowchart showing the print data configuration process.

The print data configuration process is configured to move first to step S500, as shown in FIG. 16, when executed in step S466.

In step S500, the first divided print data corresponding to the job management information located in step S454 is read from the storage device 82. The process moves to step S502 to decode the read first divided print data, based the aforesaid decryption algorithm. Then, the process moves to step S504 to extract the division procedure identifier from the decoded first divided print data, and then moves to step S506.

In step S506, it is determined whether the extracted division procedure identifier is "1" or not. If it is determined that the division procedure identifier is not "1" (No), the process moves to step S508, wherein the first divided image data is extracted from the decoded first divided print data, and the second divided image data is extracted from the received second divided print data. Then, the process moves to step S510.

In step S510, the original image data is restored from the extracted first and second divided image data in accordance with the division procedure corresponding to the extracted division procedure identifier. Specifically, an image data restoration process is prepared for each division procedure identifier, and the image data restoration process corresponding to the extracted division procedure identifier is executed. For example, a first image data restoration process is executed if the division procedure identifier is "2", while a second image data restoration process is executed if the division procedure identifier is "3". The typical image data restoration process is configured as follows. That is, data are extracted in units of a first data length (a data length equivalent to the number of specified bits) beginning with the top of the first divided image data, and the extracted data are allocated to the specified bits. Data are extracted in units of a second data length (a data length equivalent to the number of bits other than the specified bits) beginning with the top of the second divided image data, and the extracted data are allocated to the bits other than the specified bits.

Subsequently, the process moves to step S512 to extract the print setting information from the decoded first divided print data. The process moves to step S514 to configure the print data based on the extracted print setting information and the decoded/extracted image data. Thus, the process ends its series of steps and is restored to the original step.

On the contrary, if it is determined in step S506 that the extracted division procedure identifier is "1" (Yes), the process moves to step S516 to extract the image data from the received second divided print data, and then moves to step S512.

The operation of this embodiment will now be described.

On the host terminal 100, the user uses the document creation application, etc. to make a request for printing.

In the host terminal 100, when the request for printing is made, then through steps S102 to S108, the print data is generated, the transmission and division procedure identifiers are selected, and the authentication information is generated. Through steps S250 to S254, the print setting information and the image data are extracted from the print data, and the job management information including the fields 422 to 438 is generated. When the selected division procedure identifier is other than "1" on this occasion, then through steps S258 to S262, the image data is divided into two in accordance with the division procedure corresponding to the division procedure identifier. Thus, the job management information and the first divided image data are configured as the first divided print data, and the second image data is configured as the second divided print data. Through steps S114 to S118, the first divided print data is transmitted to the network printer 200 together with the first print request, and the second divided print data is saved into the storage device 62.

In the network printer 200, when the first divided print data is received together with the first print request, then through steps S404 to S406, the job management information is extracted from the received first divided print data, and the first divided print data is saved into the storage device 82 in corresponding relationship with the job management information.

Next, on the host terminal 100, the user inserts the authentication card into the card writer 66 and causes the card writer 66 to write the authentication information into the authentication card. Additionally, the authentication information may be pre-written in the authentication card. In this case, the card writer 66 need not be disposed in the host terminal 100.

Next, the user goes to the user authentication apparatus 300 and inserts the authentication card into the card reader 40.

In the user authentication apparatus 300, when the authentication card is inserted into the card reader 40, the card reader 40 reads the authentication information from the authentication card, and the authentication information transmission section 41 transmits the read authentication information to the network printer 200 together with the second print request.

In the network printer 200, when the authentication information is received together with the second print request, then through step S454, the job management information including the authentication information identical to the received authentication information is retrieved from within the storage device 82. When the appropriate job management information is located as a result thereof, then through steps S458 to S462, the host terminal information and the transmission procedure identifier are extracted from the appropriate job management information. Thus, the acquisition request is transmitted to the setting port of the host terminal 100 based on the extracted host terminal information and transmission procedure identifier.

In the host terminal 100, when the acquisition request is received from the setting port, then through steps S304 and S306, the second divided print data corresponding to the port accessed is read from within the storage device 62. Thus, the read second divided print data is transmitted to the network printer 200.

In the network printer 200, when the second divided print data is received, then through steps S500 to S504, the first divided print data corresponding to the appropriate job management information is read from within the storage device 82. Thus, the division procedure identifier is extracted from the first divided print data. When the extracted division procedure identifier is other than "1" on this occasion, then through steps S508 and S510, the divided image data are extracted from the first and second divided print data, respectively. Thus, the original image data is restored from the divided image data in accordance with the division procedure corresponding to the extracted division procedure identifier. Through steps S512, S514, and S468, the print setting information is extracted from the first divided print data, and the print data is configured based on the print setting information and the image data. Thus, printing is performed based on the configured print data.

A description will now be given of the case in which "1" is selected as the division procedure identifier.

In the host terminal 100, when "1" is selected as the division procedure identifier, then through steps S266 and S268, the job management information is configured as the first divided print data, and the image data is configured as the second divided print data. Through steps S114 to S118, the first divided print data is transmitted to the network printer 200 together with the first print request, and the second divided print data is saved into the storage device 62.

In the network printer 200, when the second divided print data is received, then through steps S500 to S504, the first divided print data corresponding to the appropriate job management information is read from within the storage device 82, and the division procedure identifier is extracted from the first divided print data. Through steps S516, S512, and S514, the image data is extracted from the second divided print data, and the print setting information is extracted from the first divided print data. Thus, the print data is configured based on the print setting information.

Additionally, when an authentication card having recorded therein fraudulent authentication information is used, then in the network printer 200, an error message to the effect that authentication cannot be obtained is displayed through step S472.

Besides, when the second divided print data cannot be received due to a communication failure, etc., then in the network printer 200, an error message to the effect that the print data cannot be acquired is displayed through step S470.

Besides, when an acquisition request is transmitted to a port other than the setting port by a fraudulent access, etc., such an access is refused in the host terminal 100.

Thus, in this embodiment, the host terminal 100 is configured as follows. That is, the print data is divided, and the divided first divided print data and the job management information included therein are transmitted to the network printer 200. The divided second divided print data is saved into the storage device 62, and the second divided print data in the storage device 62 is transmitted to the network printer 200 in response to the acquisition request. The network printer 200 is configured as follows. That is, when the first divided print data is received, the job management information is extracted from the received first divided print data, and the first divided print data and the job management information are saved into the storage device 82 in their corresponding relationship. When the authentication information is received, the job management information including the authentication information identical to the received authentication information is retrieved from within the storage device 82. When the appropriate job management information is located, the second divided print data is acquired from the host terminal 100. The print data is configured based on the acquired second divided print data and the corresponding first divided print data in the storage device 82. Thus, printing is performed based on the configured print data.

Thereby, the print data is divided into two, and the divided print data are separately transmitted to the network printer 200, thus making it possible to reduce the possibility that all the print data may be stolen by a fraudulent access, etc. Besides, the eligibility to use the print data is determined based on the authentication information that includes the job ID, user information, and host terminal information. Therefore, even if a plurality of users make print requests quite at the same time or almost at the same time, it is possible to reduce the possibility that user's own print content may be seen by another user. Accordingly, confidentiality of the print data and content can be more protected than ever before.

Furthermore, in this embodiment, the host terminal 100 is configured as follows. That is, any one transmission procedure is determined from among the plurality of different transmission procedures. The transmission procedure identifier indicative of the determined transmission procedure is transmitted to the network printer 200. The second divided print data is transmitted in accordance with the determined transmission procedure. The network printer 200 is configured to acquire the second divided print data based on the received transmission procedure identifier.

Thereby, the second divided print data cannot be acquired unless in accordance with the transmission procedure determined by the host terminal 100. Therefore, it is possible to reduce the possibility that the second divided print data may be stolen by a fraudulent access, etc. from the host terminal 100. Accordingly, the confidentiality of the print data can be more reliably protected.

Furthermore, in this embodiment, the host terminal 100 is configured as follows. That is, any one division procedure is determined from among the plurality of different division procedures. The print data is divided in accordance with the determined division procedure. The division procedure identifier indicative of the determined division procedure is transmitted to the network printer 200. The network printer 200 is configured to configure the print data based on the received division procedure identifier.

Thereby, the print data cannot be configured unless in accordance with the division procedure determined by the host terminal 100. Therefore, even if the divided print data is stolen, it is possible to reduce the possibility that the print content may be leaked. Accordingly, the confidentiality of the print content can be more reliably protected.

Furthermore, in this embodiment, the host terminal 100 is configured such that the print data is divided into two: the first divided print data made up of the job management information and the first divided image data, and the second divided print data made up of the second divided image data.

Thereby, the image data is divided, and the divided image data are separately transmitted to the network printer 200. Therefore, it is possible to reduce the possibility that all the image data may be stolen by a fraudulent access, etc. Accordingly, the confidentiality of the print data can be more reliably protected.

Furthermore, in this embodiment, the host terminal 100 is configured as follows. That is, data are extracted in units of the predetermined data length, beginning with the top of the image data. Out of the extracted data, data of specified bits are configured as the first divided image data, and data of bits other than the specified bits are configured as the second divided image data.

Thereby, it becomes difficult both to restore the print content from only the first divided print data and to restore the print content from only the second divided print data. Therefore, even if any one of the first and second divided print data is stolen, it is possible to reduce the possibility that the print content may be leaked. Accordingly, the confidentiality of the print content can be more reliably protected.

Furthermore, in this embodiment, the host terminal 100 is configured to divide the print data into two: the first divided print data made up of the job management information and the second divided print data made up of the image data.

Thereby, only the job management information is included in the first divided print data. Therefore, even if the first divided print data is stolen by a fraudulent access, etc. from the network printer 200, the print content will never be leaked. Accordingly, the confidentiality of the print data can be more reliably protected.

In the aforesaid first embodiment, the host terminal 100 corresponds to the device utilization apparatus of aspect 1, 2, 4, 12, 16, 18, 19, 21, 22, 23, 24, 25, 27, 29, 33, 35, 46, 47, or 49. The transmission procedure determination section 13 and step S104 correspond to the transmission procedure determination unit of aspect 2 or 19. Besides, step S104 corresponds to the transmission procedure determination step of aspect 36 or 47. The transmission procedure determination section 14 and step S106 correspond to the division procedure determination unit of aspect 4 or 21. Step S106 corresponds to the division procedure determination step of aspect 38 or 49.

Besides, in the aforesaid first embodiment, the print data division section 15 and step S112 correspond to the output data division unit of aspect 1, 4, 5, 6, 7, 8, 18, 21, 22, 23, 24, or 25. Step S112 corresponds to the output data division step of aspect 35, 38, 39, 40, 41, 42, 46, 49, 50, 51, 52, or 53. The division print data transmission section 16, the I/F 58, and step S116 correspond to the first divided output data transmission unit of aspect 1, 5, 6, 18, 22, or 23, the collated information transmission unit of aspect 1 or 18, the transmission procedure information transmission unit of aspect 2 or 19, or the division procedure information transmission unit of aspect 4 or 21. Besides, step S116 corresponds to the first divided output data transmission step of aspect 35, 39, 40, 46, 50, or 51, the collated information transmission step of aspect 35 or 46, the transmission procedure information transmission step of aspect 36 or 47, or the division procedure information transmission step of aspect 38 or 49.

Besides, in the aforesaid first embodiment, the divided print data transmission section 18, the I/F 58, and steps S300 to S306 correspond to the second divided output data transmission unit of aspect 1, 2, 5, 6, 10, 18, 19, 22, 23, or 27. Steps S300 to 306 correspond to the second divided output data transmission step of aspect 35, 36, 39, 40, 44, 46, 47, 50, 51, or 55. Besides, the network printer 200 corresponds to the network device of aspect 1, 2, 4, 12, 13, 15, 16, 18, 19, 21, 35, 36, 38, 46, 47, or 49. The divided print data storage section 30 and the storage device 82 correspond to the divided output data storage unit of aspect 1, 2, 4, 12, 13, 15, 16, 29, 30, 32, 33, 46, 47, or 49.

Besides, in the aforesaid first embodiment, the divided print data reception section 31, the I/F 78, and step S402 correspond to the divided output data reception unit of aspect 1, 12, or 16, the collated information reception unit of aspect 1, 12, or 16, the transmission procedure information reception unit of aspect 2 or 13, or the division procedure information reception unit of aspect 4 or 15. Besides, step S402 corresponds to the divided output data reception step of aspect 29, 33, or 46, the collated information reception step of aspect 29, 33, or 46, the transmission procedure information reception step of aspect 30 or 47, or the division procedure information reception step of aspect 32 or 49.

Besides, in the aforesaid first embodiment, the divided print data save section 32 and step S406 correspond to the divided output data save unit of aspect 1, 2, 4, 12, 13, 15, or 16. Step S406 corresponds to the divided output data save step of aspect 29, 30, 32, 33, 46, 47, or 49. Besides, the authentication information reception section 33, the I/F 78, and step S452 correspond to the collated information acquisition step of aspect 1, 12, or 16, and step 452 corresponds to the collated information acquisition step of aspect 29, 33, or 46. The divided print data authentication acquisition section 34, the I/F 78, and steps S454 to S464 correspond to the divided output data acquisition unit of aspect 1, 2, 4, 12, 13, or 15.

Besides, in the aforesaid first embodiment, steps S454 to S464 correspond to the divided output data acquisition step of aspect 29, 30, 32, 46, 47, or 49. The print data configuration section 35 and step S466 correspond to the output data configuration unit of aspect 1, 4, 7, 12, 15, 16, or 24. Besides, step S466 corresponds to the output data configuration step of aspect 29, 32, 33, 41, 46, 49, or 52. The printing section 36, the printer engine 84, and step S468 correspond to the output unit of aspect 1 or 12. Step S468 corresponds to the output step of aspect 29 or 46.

Besides, in the aforesaid first embodiment, the print data corresponds to the output data of aspect 1, 2, 4, 5, 6, 7, 8, 10, 12, 13, 15, 16, 18, 19, 21, 22, 23, 24, 25, 27, 29, 30, 32, 33, 35, 36, 38, 39, 40, 41, 42, 44, 46, 47, 49, 50, 51, 52, 53, or 55. The print setting information corresponds to the output setting information of aspect 5, 6, 22, 23, 39, 40, 50, or 51. Besides, the image data corresponds to the content data of aspect 5, 6, 22, 23, 39, 40, 50, or 51. The job management information corresponds to the collated information of aspect 1, 2, 4, 12, 13, 15, 16, 18, 29, 30, 32, 33, 35, 46, 47 or 49.

Besides, in the aforesaid first embodiment, the authentication information corresponds to the collated information of aspect 1, 2, 12, 13, 16, 29, 30, 33, 46, or 47. The transmission procedure identifier corresponds to the transmission procedure information of aspect 2, 13, 19, 30, 36, or 47. The division procedure identifier corresponds to the division procedure information of aspect 4, 15, 21, 32, 38, or 49.

Figure 17:
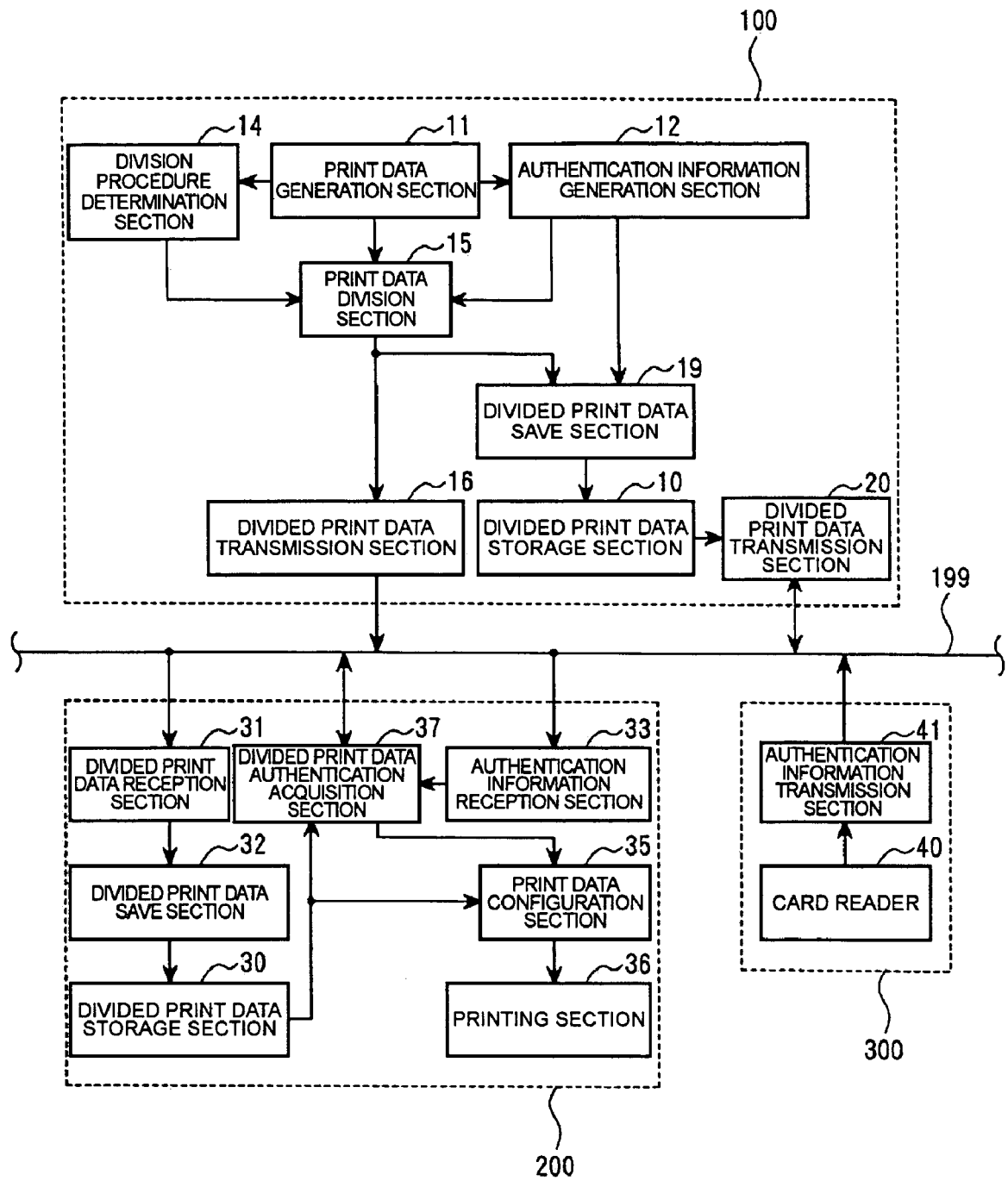
FIG. 17 is a functional block diagram showing the functional outline of a network system.
Figure 18:
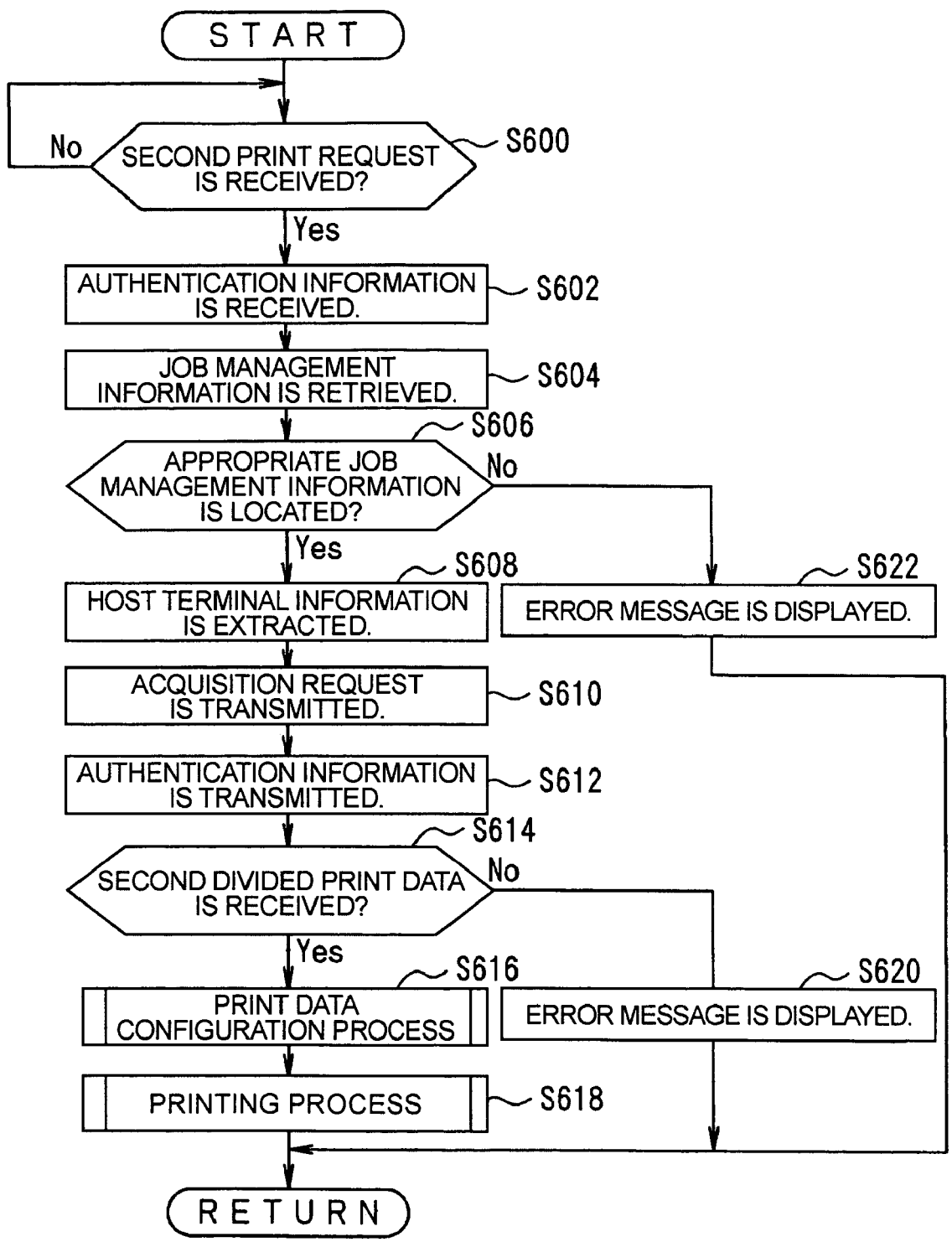
FIG. 18 is a flowchart showing a print control process.
Figures 19, 20:
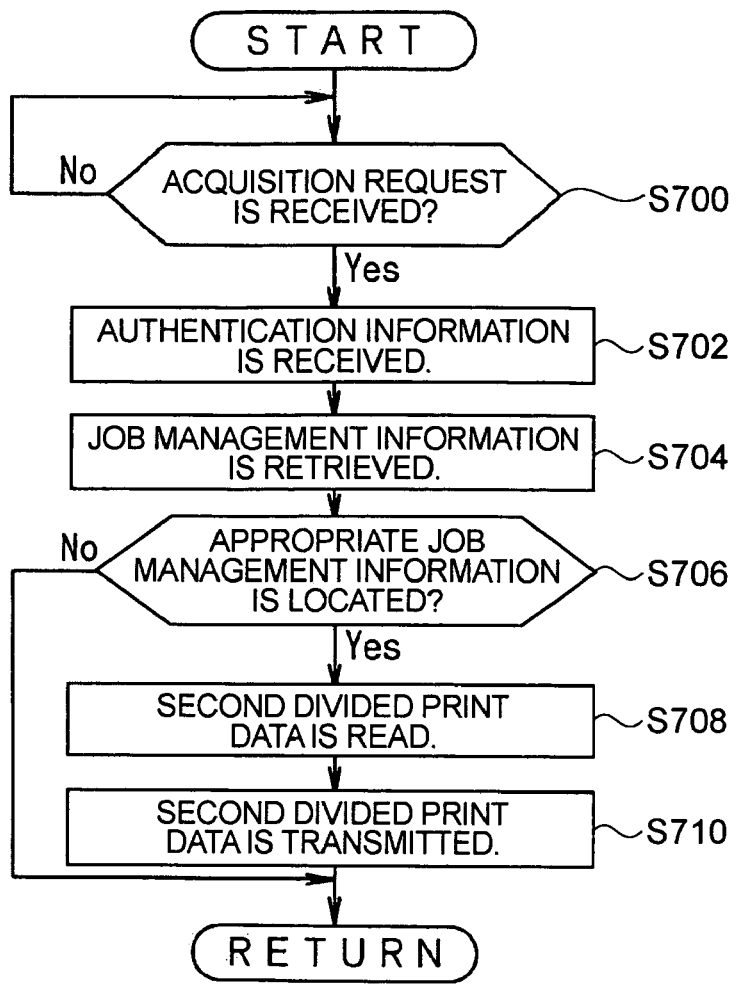
FIG. 19 is a flowchart showing a divided print data transmission process.
FIG. 20 is a diagram showing the data structure of a divided print data management table.

A second embodiment of the invention will now be described with reference to the drawings. FIGS. 17 to 19 are diagrams showing the second embodiment of the authentication output system, network device, device utilization apparatus, output control program, output request program, and authentication output method of the invention.

In this embodiment, as shown in FIG. 17, the authentication output system, network device, device utilization apparatus, output control program, output request program, and authentication output method of the invention are applied to using an authentication card to perform printing on a network printer 200. This embodiment is different from the aforesaid first embodiment in that a host terminal 100 retrieves and transmits second divided print data based on authentication information. Additionally, only portions different from those of the aforesaid first embodiment will hereinafter be described, and portions overlapping with those of the aforesaid first embodiment are identified by like reference numerals and thus omitted from the description.

The functional outline of a network system to which the invention is applied will first be described with reference to FIG. 17.

FIG. 17 is a functional block diagram showing the functional outline of the network system.

As shown in FIG. 17, the host terminal 100, the network printer 200, and a user authentication apparatus 300 are connected to a network 199.

The host terminal 100 has a divided print data storage section 10, a print data generation section 11, an authentication information generation section 12, a print data division section 15, and a divided print data transmission section 16.

The host terminal 100 further has a divided print data save section 19 and a divided print data transmission section 20. The divided print data save section 19 saves second divided print data, which is divided by the print data division section 15, into the divided print data storage section 10. The divided print data transmission section 20 transmits the second divided print data in the divided print data storage section 10 to the network printer 200 in response to an acquisition request from the network printer 200.

The divided print data save section 19 saves the second divided print data into the divided print data storage section 10 in corresponding relationship with job management information that includes the authentication information generated by the authentication information generation section 12 and a division procedure identifier indicative of a division procedure determined by a division procedure determination section 14.

When receiving the authentication information together with the acquisition request, the divided print data transmission section 20, based on the received authentication information, retrieves the appropriate job management information from within the divided print data storage section 10. When locating the appropriate job management information, the divided print data transmission section 20 transmits the second divided print data corresponding to the located appropriate job management information.

The network printer 200 has a divided print data storage section 30, a divided print data reception section 31, a divided print data save section 32, an authentication information reception section 33, a print data configuration section 35, and a printing section 36.

The network printer 200 further has a divided print data authentication acquisition section 37 that acquires the second divided print data from the host terminal 100, when determining eligibility to use print data based on the authentication information received by the authentication information reception section 33 and on the job management information in the divided print data storage section 30.

The divided print data authentication acquisition section 37, based on the authentication information, retrieves the appropriate job management information from within the divided print data storage section 30. When locating the appropriate job management information, the divided print data authentication acquisition section 37 determines the eligibility to use the print data, and thus transmits the authentication information to the host terminal 100 together with the acquisition request.

The configuration of the network printer 200 will now be described.

A CPU 70 is configured to start a predetermined program stored in a predetermined region of a ROM 72 to execute a print control process shown in the flowchart of FIG. 18, in place of the print control process shown in the flowchart of FIG. 15.

FIG. 18 is a flowchart showing the print control process.

The print control process is configured to move first to step S600, as shown in FIG. 18, when executed by the CPU 70.

In step S600, it is determined whether a second print request is received or not. If it is determined that the second print request is received (Yes), the process moves to step S602, but if not (No), the process waits in step S600 until the second print request is received.

In step S602, the authentication information that includes user information, the host terminal information, and a job ID are received. The process moves to step S604, wherein the job management information including authentication information identical to the received authentication information is retrieved from within the storage device 82. Then, the process moves to step S606 to determine whether the appropriate job management information is located or not. If it is determined that the appropriate job management information is located (Yes), the process moves to step S608.

In step S608, the host terminal information is extracted from the located job management information. The process moves to step S610 to transmit the acquisition request to an IP address included in the extracted host terminal information. Then, the process moves to step S612 to transmit the received authentication information to the IP address included in the extracted host information, and then moves to step S614.

In step S614, it is determined whether the second divided print data is received or not. If it is determined that the second divided print data is received (Yes), the process moves to step S616 to execute the same print data configuration process as that of step S466. The process moves to step S618, wherein printing is performed by a printer engine 84 based on the print data configured in the print data configuration process. Thus, the process ends its series of steps and is restored to the original step.

On the contrary, if it is determined in step S614 that the second divided print data is not received (No), the process moves to step S620, wherein an error message to the effect that the print data cannot be acquired is displayed on an operation panel 80. Thus, the process ends its series of steps and is restored to the original step.

On the other hand, if it is determined in step S606 that the appropriate job management information is not located (No), the process moves to step S622, wherein an error message to the effect that authentication cannot be obtained is displayed on the operation panel 80. Thus, the process ends its series of steps and is restored to the original step.

The configuration of the host terminal 100 will now be described.

A CPU 50 is configured to start a predetermined program stored in a predetermined region of a ROM 52 to execute a divided print data transmission process shown in the flowchart of FIG. 19, in place of the divided print data transmission process shown in the flowchart of FIG. 12.

FIG. 19 is a flowchart showing the divided print data transmission process.

The divided print data transmission process is configured to move first to step S700, as shown in FIG. 19, when executed by the CPU 50.

In step S700, it is determined whether the acquisition request is received or not. If it is determined that the acquisition request is received (Yes), the process moves to step S702, but if not (No), the process waits in step S700 until the acquisition request is received.

In step S702, the authentication information is received. The process moves to step S704, wherein the job management information including authentication information identical to the received authentication information is retrieved from within the storage device 62. Then, the process moves to step S706 to determine whether the appropriate job management information is located or not. If it is determined that the appropriate job management information is located (Yes), the process moves to step S708.

In step S708, the second divided print data corresponding to the located job management information is read from within the storage device 62. The process moves to step S710 to transmit the read second divided print data to the network printer 200. Thus, the process ends its series of steps and is restored to the original step.

On the contrary, If it is determined in step S706 that the appropriate job management information is not located (No), the process ends its series of steps and is restored to the original step.

The operation of this embodiment will now be described.

In the network printer 200, when the authentication information is received together with the second print request, then through step S604, the job management information including the authentication information identical to the received authentication information is retrieved from within the storage device 82. When the appropriate job management information is located as a result thereof, then through steps S608 to S612, the host terminal information is extracted from the appropriate job management information. Thus, the authentication information is transmitted together with the acquisition request based on the extracted host terminal information.

In the host terminal 100, when the authentication information is received together with the acquisition request, then through step S704, the job management information including the authentication information identical to the received authentication information is retrieved from within the storage device 82. When the appropriate job management information is located as a result thereof, then through steps S708 and S710, the second divided print data corresponding to the located job management information is read from within the storage device 62. Thus, the read second divided print data is transmitted to the network printer 200.

In the network printer 200, when the second divided print data is received, then through steps S616 and S618, first divided print data corresponding to the appropriate job management information is read from within the storage device 82, and print data is configured based on the first and second divided print data. Thus, printing is performed based on the configured print data.

The other operations are the same as those of the aforesaid first embodiment.

Thus, in this embodiment, the network printer 200 is configured as follows. That is, when the authentication information is received, the job management information including the authentication information identical to the received authentication information is retrieved from within the storage device 82. When the appropriate job management information is located, the authentication information is transmitted to the host terminal 100 together with the acquisition request. The host terminal 100 is configured as follows. That is, when the authentication information is received together with the acquisition request, the appropriate job management information is retrieved from the storage device 62 based on the received authentication information. When the appropriate job management information is located, the second divided print data corresponding to the appropriate job management information is transmitted to the network printer 200.

Thereby, the print data is divided, and the divided print data are separately transmitted to the network printer 200, thus making it possible to reduce the possibility that all the print data may be stolen by a fraudulent access, etc. Besides, the eligibility to use the print data is determined based on the authentication information that includes the user information, host terminal information, and job ID. Therefore, even if a plurality of users make print requests quite at the same time or almost at the same time, it is possible to reduce the possibility that user's own print content may be seen by another user. Accordingly, confidentiality of the print data and content can be more protected than ever before.

In the aforesaid second embodiment, the divided print data storage section 10 and the storage device 62 correspond to the second divided output data storage unit of aspect 3, 20, 37, or 48. The divided print data save section 19 corresponds to the second divided output data save unit of aspect 3 or 20. The divided print data transmission section 20, an I/F 58, and steps S700 to S710 correspond to the second divided output data transmission unit of aspect 3 or 20. Besides, steps S700 to S710 correspond to the second divided output data transmission step of aspect 37 or 48. The divided print data authentication acquisition section 37, an I/F 78, and steps S604 to S614 correspond to the divided output data acquisition unit of aspect 3 or 14.

Besides, in the aforesaid second embodiment, steps S604 to S614 correspond to the divided output data acquisition step of aspect 31 or 48.

Additionally, in the aforesaid first and second embodiments, the host terminal 100 is configured as follows. That is, data are extracted in units of a predetermined data length, beginning with the top of image data. Out of the extracted data, the data of specified bits are configured as first divided image data. The data of bits other than the specified bits are configured as second divided image data. However, the invention is not limited thereto, but may be configured such that the image data are classified in units of a predetermined data length (e.g., 1 byte) and are divided in accordance with the order of the predetermined data length units thereof. Specifically, data are extracted in units of a predetermined data length, beginning with the top of image data. When the extracted data are in a predetermined order (e.g., in an even order), the extracted data are configured as the first divided image data. In contrast, when the extracted data are in other than the predetermined order (e.g., in an odd order), the extracted data are configured as the second divided image data.

Thereby, it becomes difficult both to restore the print content from only the first divided print data and to restore the print content from only the second divided print data. Therefore, even if any one of the first and second divided print data is stolen, it is possible to reduce the possibility that the print content may be leaked.

Besides, in the aforesaid first embodiment, the host terminal 100 is configured to control an access by packet filtering. However, the invention is not limited thereto. The host terminal 100 may be configured to control the access by (1) access control using filtering, (2) access control using secure authentication, and (3) access control using job management information. Specifically, the following configurations can be proposed for the above respective controls.

(1) Access Control using Applied Technology of Filtering

First, as a communication procedure of the second divided print data, a plurality of specific communication procedures are pre-defined in addition to packet filtering. The term "specific communication procedure" means that communication is performed by the combination of a port number out of the ordinary and a protocol kind. For example, a FTP (File Transfer Protocol) normally uses a No. 21 port, but a No. 8021 port is used to perform communication through the FTP.

Second, it can be determined whether an access is permitted or refused, based on the IP address of the network printer 200. The name of the network printer 200 may be resolved using not only the IP address but a DNS (Domain Name System).

Third, communication can be performed using a port number that is not used in the host terminal 100.

Fourth, communication can be performed using a port number of the network printer 200. The port number of the host terminal 100 to be accessed is narrowed down by port scan, etc., but a port number of the network printer 200 to gain access thereto is pre-set to provide the target of packet filtering. Thus, it is possible to reduce the possibility that the second divided print data may be stolen by a fraudulent access, etc. from the host terminal 100. Additionally, such a port number need only be included in transmission procedure identifier.

Fifth, communication can be performed as a communication protocol for transmitting the second divided print data is pre-designated in the network printer 200. That is, filtering at a session-layer level is performed in addition to the aforesaid three, second to fourth types of packet filtering. This makes it difficult for a third person to specify a communication method, thus enabling an improvement in security. The communication protocol is set for each print job, in the transmission procedure identifiers. The session-layer communication protocol is, for example, an HTTP (Hyper Text Transfer Protocol), an FTP, an LPR, an SMTP (Simple Mail Transfer Protocol), or a POP.

(2) Access Control using Secure Authentication

First, communication can be performed using authentication by ID and passport. The communication between the host terminal 100 and the network printer 200 need only be secure even with such simple authentication.

Second, communication can be performed using a challenge-response method (one of authentication methods). The first divided print data is used for authentication as a challenge code. The network printer 200 and the host terminal 100 each have a public key and an encryption key.

In the network printer 200, the first divided print data serving as the challenge code is encoded using the public key of the host terminal 100 to generate a response code, and the generated response code is transmitted to the host terminal 100.

In the host terminal 100, the first divided print data is pre-stored in the storage device 62, and when the response code is received, the received response code is decoded using a secret key of the host terminal 100. Thus, the decoded response code and the first divided print data in the storage device 62 are collated with each other to determine whether they are identical to each other or not. When it is determined as a result thereof that they are identical to each other, it can be determined that the source of request for the second divided print data is the network printer 200 that has transmitted the first divided print data. Thus, the second divided print data is transmitted to the source of request.

(3) Access Control using Job Management Information

The validity of a data destination can be determined by the exchange of part of the job management information between the network print 200 and the host terminal 100, which can be known only therebetween.

First, in the network printer 200, a print job generation date and time (e.g., Jul. 30, 2004 15:00:20) is extracted from the job management information, and the extracted print job generation date and time with the acquisition request included therein is transmitted to the host terminal 100.

In the host terminal 100, the job management information is pre-stored in the storage device 62. When the acquisition request is received, the print job generation data and time included in the received acquisition request and a print job generation date and time included in the job management information in the storage device 62 are collated with each other to determine whether they are identical to each other or not. When it is determined as a result thereof that they are identical to each other, it can be determined that the source of request for the second divided print data is the network printer 200 that has transmitted the first divided print data. Thus, the second divided print data is transmitted to the source of request.

Of course, not only the print job generation date and time but any other information of the job management information can be used.

Second, communication can be performed by setting an item name used for authentication out of the job management information. First, an item name of the job management which is used for authentication is pre-designated in the job management information. Not only the kind of items but also the order thereof can be used for authentication. An authentication item designation identifier is, for example, "Send=image quality, print pages, print job generation date and time".

In the network printer 200, a parameter of the designated item is extracted from the job management information based on the authentication item designation identifier included in the job management information. The extracted parameter (item value) with the acquisition request included therein is transmitted to the host terminal 100. On this occasion, the parameter is configured like a password, such as [high image quality, 5 pages, Jul. 30, 2004 15:00:20].

In the host terminal 100, the job management information is pre-stored in the storage device 62. When the acquisition request is received, then based on the authentication item designation identifier included in the job management information in the storage device 62, the parameter included in the received acquisition request and part of the job management information in the storage device 62 are collated with each other to determine whether they are identical to each other or not. When it is determined as a result thereof that they are identical to each other, it can be determined that the source of request for the second divided print data is the network printer 200 that has transmitted the first divided print data. Thus, the second divided print data is transmitted to the source of request.

Besides, in the aforesaid first and second embodiments, the host terminal 100 is configured to prepare an image data division process for each division procedure identifier, and to execute an image data division process corresponding to the selected division procedure identifier. However, the invention is not limited thereto. The host terminal 100 may be configured to prepare an argument for each division procedure identifier and to give an argument corresponding to the selected division procedure identifier, thus executing the image data division process.

Besides, in the aforesaid first and second embodiments, the network printer 200 is configured to prepare an image data restoration process for each division procedure identifier, and to execute an image data restoration process corresponding to the extracted division procedure identifier. However, the invention is not limited thereto. The network printer 200 may be configured to prepare an argument for each division procedure identifier and to give an argument corresponding to the extracted division procedure identifier, thus executing the image data restoration process.

Besides, in the aforesaid first and second embodiments, the host terminal 100 is configured to divide the image data out of the print data so that the divided image data are allocated to different divided print data. However, the invention is not limited thereto. The host terminal 100 may be configured to divide the print setting information out of the print data so that the divided pieces of print setting information are allocated to different divided print data.

Besides, the aforesaid first and second embodiments are configured such that the print data is divided into two and then the divided print data are transmitted and received. However, the invention is not limited thereto, but may be configured such that the print data is divided into a larger number of pieces and then the thus-divided print data are transmitted and received. This makes it possible to further reduce the possibility that all the print data may be stolen by a fraudulent access, etc. Thus, the confidentiality of the print data can be more reliably protected.

Besides, in the aforesaid first and second embodiments, the network printer 200 is configured to extract the job management information from the received first divided print data, and to save the first divided print data and the job management information into the storage device 82 in their corresponding relationship. However, the invention is not limited thereto. The network printer 200 may be configured to decode only part of the job management information out of the first divided print data, and to save the partially decoded first divided print data. Besides, the network printer 200 may be configured to save the received first divided print data as it is, and to, during retrieval (steps S454 and S604), perform retrieval while decoding part of the job management information out of the first divided print data.

Besides, in the aforesaid first and second embodiments, the user authentication apparatus 300 is configured separately from the network printer 200. However, the invention is not limited thereto, but the user authentication apparatus 300 may be configured integrally with the network printer 200.

Besides, the aforesaid first and second embodiments are configured such that authentication is performed using the authentication card. However, the invention is not limited thereto, but may be configured such that authentication is performed using user's fingerprint information. In this case, a fingerprint sensor need only be disposed in place of the card reader 40.

Besides, in the aforesaid first and second embodiments, the timing of transmitting the first divided print data is not particularly described. However, the first divided print data may be transmitted with the timing of generating the print data, or may be transmitted when a predetermined time elapses after the print data is generated.

Besides, the aforesaid first embodiment are configured such that a port number as the transmission procedure is changed for each print job. However, the invention is not limited thereto, but may be configured such that the encryption key or a communication route may be changed for each print job. In this case, the encryption key or communication route information is configured as the transmission procedure identifier.

Besides, in the aforesaid first and second embodiments, the second divided print data is configured as the image data. However, the invention is not limited thereto, but information for specifying a job out of the job management information may be configured to be included in the second divided print data.

Besides, in the aforesaid first and second embodiments, the authentication information is configured to include the user information, host terminal information, and job ID. However, the invention is not limited thereto, but the authentication information need only be configured to include at least one of them. However, since it is assumed that a plurality of users may use the identical host terminal 100, it is preferable in such a case that the authentication information includes the user information or the job ID.

Besides, in the aforesaid first and second embodiments, the network printer 200 is configured to access the host terminal 100 based on the IP address included in the host terminal information. However, the invention is not limited thereto, but the following two configurations can be proposed as the configuration of accessing the host terminal 100.

First, an access information table, having the IP address of the host terminal 100 registered therein in corresponding relationship with the user information, is pre-stored in the storage device 82. The network printer 200 retrieves appropriate IP address from within the access information table, based on the user information included in the authentication information, and then accesses the host terminal 100 based on the located IP address. In this case, the host terminal information need not be included in the authentication information.

Second, upon reception of the first divided print data, the network printer 200, from the header of its packet, acquires the IP address of the host terminal 100 that is the destination. The network printer 200 stores the received second divided print data into the storage device 82 in corresponding relationship with the acquired IP address. To acquire the second divided print data, the network printer 200 reads the IP address corresponding to the first divided print data from the storage device 82, and then accesses the host terminal 100 based on the read IP address. In this case, the host terminal information need not be included in the authentication information.

Besides, the aforesaid first and second embodiments are configured such that printing is performed by collating the authentication information with the job management information. However, the invention is not limited thereto, but may be configured such that printing is performed using the user authentication process in combination. Specifically, information as to whether or not the user can use the network printer 200 is pre-held, and when it is determined that the user can use it, printing is performed by collating the authentication information with the job management information.

Besides, in the aforesaid first and second embodiments, the card writer 66 is disposed in the host terminal 100. However, the invention is not limited thereto, but the card writer 66 need not necessarily be disposed.

As shown in FIG. 20, the network printer 200 is configured to have stored therein a divided print data management table 420 for managing the first divided print data in corresponding relationship with the user information.

FIG. 20 is a diagram showing the data structure of the divided print data management table 420.

On this occasion, it is considered that a user X performs user authentication using an authentication card having registered therein the user information of the user X.

In the case of the aforesaid first embodiment, operation is effected as follows.

The network printer 200 can acquire unacquired second divided print data by referring to the transmission procedure identifier and IP address of the user X.

First, a transmission procedure identifier "12345" is processed. Specifically, the user information is read from the authentication card. The transmission procedure identifier and IP address which correspond to the read user information are read from the divided print data management table 420. The second divided print data is acquired from the host terminal 100 based on the read transmission procedure identifier and IP address. The corresponding first divided print data is read from within the storage device 82. Print data is configured based on the acquired second divided print data and the read first divided print data. Thus, a printing process is executed based on the configured print data.

Next, a transmission procedure identifier "61234" is similarly processed.

Next, a transmission procedure identifier "23456" is similarly processed.

Thus, the first divided print data held by the network printer 200 and the second divided print data acquired from the host terminal 100 can be made to correspond to each other.

In the case of the aforesaid second embodiment, operation is effected as follows.

The network printer 200 can acquire unacquired second divided print data by referring to the identification information and IP address of the first divided print data of the user X.

First, identification information "00000001" of the first divided print data is processed. Specifically, the user information is read from the authentication card. The identification information and IP address which correspond to the read user information are read from the divided print data management table 420. The second divided print data is acquired from the host terminal 100 based on the read identification information and IP address. The corresponding first divided print data is read from within the storage device 82. Print data is configured based on the acquired second divided print data and the read first divided print data. Thus, a printing process is executed based on the configured print data.

Next, identification information "00000002" of the first divided print data is similarly processed.

Next, identification information "00000003" of the first divided print data is similarly processed.

In this case as well, the first divided print data held by the network printer 200 and the second divided print data acquired from the host terminal 100 can be made to correspond to each other.

Besides, the aforesaid first and second embodiments are configured to encode the first divided print data. However, the invention is not limited thereto, but the first divided print data need not be encoded. Besides, the invention may be configured such that the second divided print data is encoded separately therefrom.

Besides, in the aforesaid first and second embodiments, the method of transmitting the first divided print data is not particularly described. However, the configuration may be such that any one selection procedure is determined from among a plurality of different selection procedures for selecting the first divided print data, and such that first divided print data is selected from among the divided print data in accordance with the determined selection procedure to transmit the selected first divided print data. The determination of a selection procedure can be made, for example, for each print request.

Figure 21:
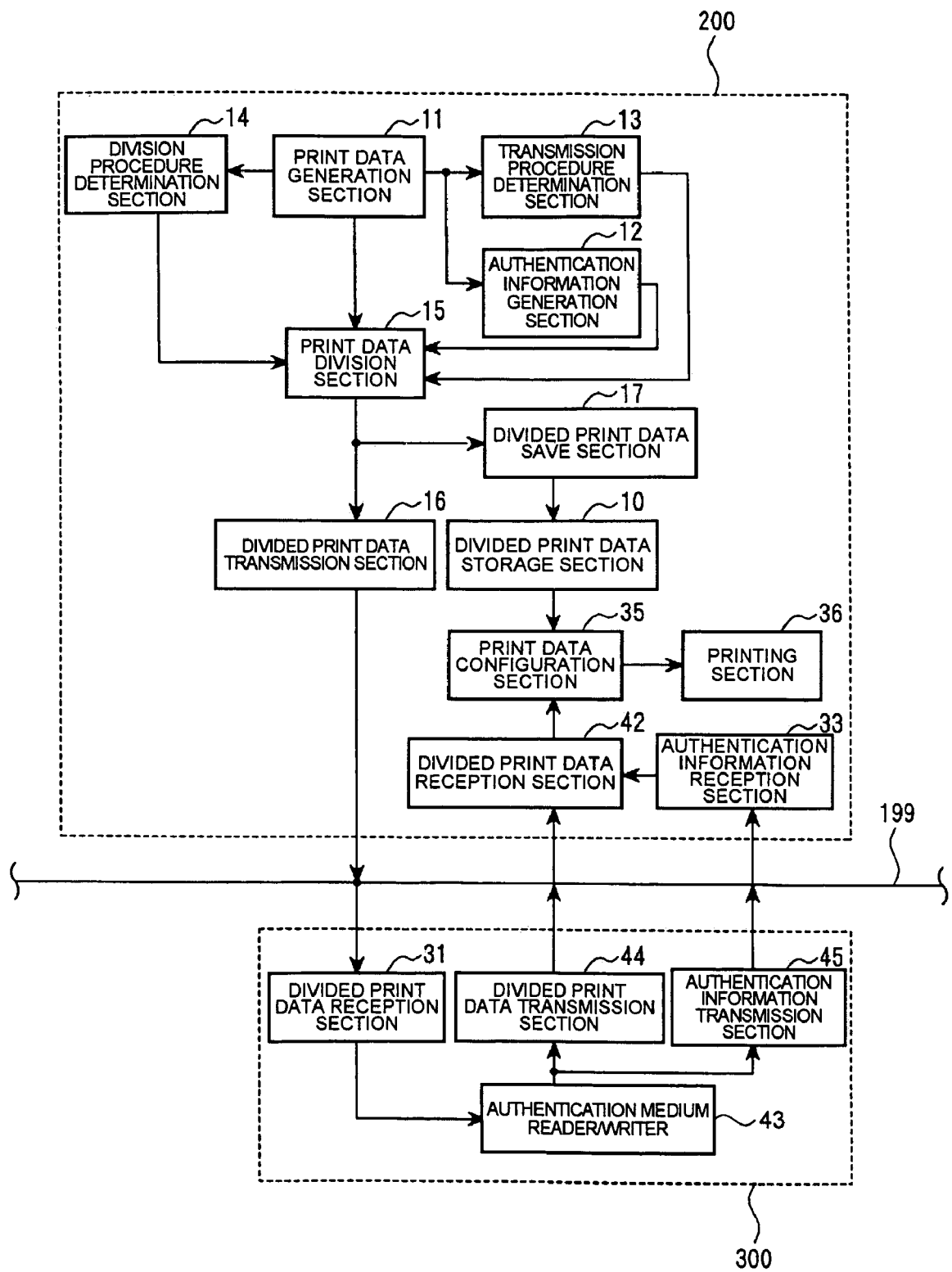
FIG. 21 is a functional block diagram showing the functional outline of a network system.

Besides, the aforesaid first and second embodiments are configured to transmit the divided print data from the host terminal 100 to the network printer 200. However, the invention is not limited thereto, but may be configured such that an image data reader such as a scanner/copy unit is attached to the network printer 200, and such that image data read by the image data reader is inputted to the network printer 200 as print data. In this case, more specifically, the configuration can be established as shown in FIG. 21. Additionally, portions overlapping with those of the aforesaid first embodiment are identified by like reference numerals and thus omitted from the description.

FIG. 21 is a functional block diagram showing the functional outline of a network system.

As shown in FIG. 21, a network printer 200 and a user authentication apparatus 300 are connected to a network 199.

The network printer 200 has a divided print data storage section 10, a print data generation section 11, an authentication information generation section 12, a transmission procedure determination section 13, a division procedure determination section 14, a print data division section 15, a divided print data transmission section 16, a divided print data save section 17, an authentication information reception section 33, a print data configuration section 23, and a printing section 36. The network printer 200 further has a divided print data reception section 42 that receives first divided print data.

The print data generation section 11 generates print data based on image data inputted from an image data reader such as a scanner/copy unit.

The print data division section 15 divides the print data in accordance with a division procedure determined by the division procedure determination section 14, and adds, to the first divided print data, job management information that includes a transmission procedure identifier indicative of a transmission procedure determined by the transmission procedure determination section 13.

The divided print data save section 17 saves second divided print data, which is divided by the print data division section 15, into the divided print data storage section 10, in corresponding relationship with authentication information generated by the authentication information generation section 12 and an division procedure identifier indicative of the division procedure determined by the division procedure determination section 14.

When determining eligibility to use the print data based on authentication information received by the authentication information reception section 33 and on the authentication information in the divided print data storage section 10, the print data configuration section 35, based on the corresponding division procedure identifier in the divided print data storage section 10, configures print data from the first divided print data received by the divided print data reception section 42 and the corresponding second divided print data in the divided print data storage section 10.

The user authentication apparatus 300 has a divided print data reception section 31, and in addition thereto, an authentication medium reader/writer 43, a divided print data transmission section 44, and an authentication information transmission section 45. The authentication medium reader/writer 43 reads and writes data into an authentication medium such as a card. The divided print data transmission section 44 transmits to the network printer 200 the first divided print data read by the authentication medium reader/writer 43. The authentication information transmission section 45 transmits to the network printer 200 the authentication information read by the authentication medium reader/writer 43.

The divided print data reception section 31 causes the authentication medium reader/writer 43 to save the first divided print data onto the authentication medium.

The divided print data transmission section 44 extracts the job management information from the first divided print data, and then transmits the first divided print data based on the transmission procedure identifier included in the selected job management information.

Thereby, the print data is divided and part of the divided print data is saved onto the authentication medium, thus making it possible to reduce the possibility that all the print data may be stolen by a fraudulent access, etc. Besides, the eligibility to use the print data is determined based on the authentication information that includes user information, host terminal information, and a job ID. Therefore, even if a plurality of users make print requests quite at the same time or almost at the same time, it is possible to reduce the possibility that user's own print content may be seen by another user. Accordingly, confidentiality of the print data and content can be more protected than ever before.

In this case, the network printer 200 corresponds to the network device of aspect 11, 17, or 56. The divided print data storage section 10 corresponds to the first divided output data storage unit of aspect 11 or 56, or the divided output data storage unit of aspect 11, 17, 34, or 56. Besides, the print data division section 15 corresponds to the output data division unit of aspect 11 or 17. The divided print data transmission section 16 corresponds to the first divided output data transmission unit of aspect 11 or the divided output data transmission unit of aspect 11 or 17. The divided print data save section 17 corresponds to the first divided output data save unit of aspect 11 or the divided output data save unit of aspect 11 or 17.

Besides, the print data configuration section 35 corresponds to the output data configuration unit of aspect 11 or 17. The printing section 36 corresponds to the output unit of aspect 11 or 17. The authentication information reception section 33 and the divided print data reception section 42 correspond to the first divided output data reception unit of aspect 11 or the divided output data reception unit of aspect 11 or 17.

In this case, the user authentication apparatus 300 corresponds to the output data management apparatus of aspect 11, 28, or 56. The divided print data reception section 31 corresponds to the second divided output data reception unit of aspect 11 or the divided output data reception unit of aspect 11 or 28. The authentication medium corresponds to the second divided output data storage unit of aspect 11 or 56, or the divided output data storage unit of aspect 11, 28, 45, or 56. Besides, the authentication medium reader/writer 43 corresponds to the second divided output data save unit of aspect 11, the divided output data save unit of aspect 11 or 28, or the collated information acquisition unit of aspect 11 or 28. The divided print data transmission section 44 and the authentication information transmission section 45 corresponds to the second divided output data transmission unit of aspect 11 or the divided output data transmission unit of aspect 11 or 28.

Besides, the aforesaid first and second embodiments have described the case in which the control program pre-stored in the ROM 52, 72 is executed in executing each of the processes shown in the flowcharts of FIGS. 4 to 6, 8, 12, 14 to 16, 18, and 19. However, the invention is not limited thereto, but may be configured to execute a program indicative of these procedures by reading it into the RAM 54, 74 from the storage medium having the program stored therein.

Here, the storage medium is a semiconductor storage medium such as a RAM and a ROM, a magnetic storage type storage medium such as an FD and an HD, an optic read storage medium such as a CD, a CDV, an LD, and a DVD, or a magnetic storage type/optic read storage medium such as an MD. Whether a read method is electronic, magnetic, optical, or the like, the storage medium includes any storage medium readable by a computer.

Besides, in the aforesaid first and second embodiments, the authentication output system, network device, device utilization apparatus, output data management apparatus, output control program, output request program, output data management program, and authentication output method of the invention are applied to using the authentication card to perform printing on the network printer 200. However, the invention is not limited thereto, but is applicable to any other case without departing from the scope of the invention. In place of the network printer 200, the invention can be applied to, for example, a projector, electronic paper, a home gateway, a personal computer, a PDA (Personal Digital Assistant), a network storage, audio equipment, a cellular phone, a PHS (trademark) (Personal Handyphone System), a watch type PDA, an STB (Set Top Box), a POS (Point of Sale) terminal, a FAX machine, a copy machine, a telephone (inclusive of an IP telephone), and other output apparatuses. That is, the invention can be applied to any apparatus that can perform an output.

For example, when the invention is applied to the projector, the configuration goes as follows. That is, when a plurality of users use one projector, only data of a user who goes to the projector is displayed. This configuration is effective when the data is not intended to be seen by any other person until a presentation is started.

For example, when the invention is applied to the display, the configuration goes as follows. That is, secure data is displayed only if its owner-user uses it.

What is claimed is:

1. An authentication output system comprising:
a network device that performs an output based on output data, the output data including image data; and
a device utilization apparatus that utilizes the network device, the network device and the device utilization apparatus being communicably connected to each other, and the network device performing the output through authentication, wherein
the device utilization apparatus has:
an output data division unit that divides the output data;
a first divided output data transmission unit that transmits to the network device any of divided output data divided by the output data division unit;
a collated information transmission unit that transmits, to the network device, collated information that includes at least one of identification information for identifying a user, identification information for identifying the device utilization apparatus, and identification information for identifying the output data; and
a second divided output data transmission unit that transmits to the network device all the remaining divided output data out of divided output data divided by the output data division unit, in response to an acquisition request from the network device;
a division procedure determination unit that, having a plurality of division procedures for dividing the output data, determines any one of the plurality of division procedures, and a division procedure information transmission unit that transmits, to the network device, division procedure information indicative of a division procedure determined by the division procedure determination unit;
and wherein
the network device has:
a divided output data reception unit that receives divided output data transmitted by the first divided output data transmission unit;
a collated information reception unit that receives collated information transmitted by the collated information transmission unit;
a divided output data save unit that saves divided output data received by the divided output data reception unit and collated information received by the collated information reception unit, into a divided output data storage unit, in their corresponding relationship;
a collation information acquisition unit that acquires collation information including the identification information;
a divided output data acquisition unit that, when determining eligibility to use the output data based on collation information acquired by the collation information acquisition unit and on collated information in the divided output data storage unit, acquires all remaining divided output data out of the divided output data, from the device utilization apparatus;
an output data configuration unit that configures the output data based on divided output data acquired by the divided output data acquisition unit and on corresponding divided output data in the divided output data storage unit; and
an output unit that performs the output based on output data configured by the output data configuration unit;

a division procedure information reception unit that receives the division procedure information from the division procedure information transmission unit; and wherein the divided output data save unit is configured to save the divided output data, the collated information, and division procedure information received by the division procedure information reception unit, into the divided output data storage unit, in their corresponding relationship;

the output data division unit is configured to divide the image data of the output data into first divided data and second divided data in accordance with a division procedure determined by the division procedure determination unit from the plurality of division procedures for dividing the output data, such that the first divided data includes specified bits extracted in units of a predetermined data length beginning with a top of the image data and such that the second divided data includes data of bits other than the specified bits, the plurality of division procedures including a first division procedure whereby 5 bits of image data are extracted as the first divided data for every 1,000 bits beginning with the top of the image data, a second division procedure whereby 7 bits of image data are extracted as the first divided output data for every 1,250 bits beginning with the top of the image data, and a third division procedure whereby 15 bits of image data are extracted as the first divided data for every 2,500 bits beginning with the top of the image data; and the output data configuration unit is configured to configure the output data based on divided output data acquired by the divided output data acquisition unit, on corresponding divided output data in the divided output data storage unit, and on division procedure information.

2. An authentication output system according to claim 1, wherein the device utilization apparatus has a transmission procedure determination unit that, having a plurality of transmission procedures for transmitting the divided output data, determines any one of the plurality of transmission procedures, and a transmission procedure information transmission unit that transmits, to the network device, transmission procedure information indicative of a transmission procedure determined by the transmission procedure determination unit; and the network device has a transmission procedure information reception unit that receives the transmission procedure information, and wherein the divided output data save unit is configured to save the divided output data, the collated information, and transmission procedure information received by the transmission procedure information reception unit, into the divided output data storage unit, in their corresponding relationship;

the divided output data acquisition unit is configured to, based on the collation information, retrieve the collated information corresponding thereto from within the divided output data storage unit, and to acquire the divided output data based on transmission procedure information corresponding to collated information located by the retrieval; and the second divided output data transmission unit is configured to transmit the divided output data in accordance with a transmission procedure determined by the transmission procedure determination unit.

3. An authentication output system according to claim 1, wherein the output data includes output setting information on output setting and content data configuring output content, and wherein the output data division unit is configured to divide the output data into first divided output data including the output setting information and second divided output data including the content data;

the first divided output data transmission unit is configured to transmit first divided output data divided by the output data division unit; and the second divided output data transmission unit is configured to transmit second divided output data divided by the output data division unit.

4. An authentication output system according to claim 1, wherein the output data includes output setting information on output setting and content data configuring output content, and wherein the output data division unit is configured to divide the output data into two groups including: first divided output data including the output setting information and part of the content data, and second divided output data including the remaining portion of the content data;

the first divided output data transmission unit is configured to transmit first divided output data divided by the output data division unit; and the second divided output data transmission unit is configured to transmit second divided output data divided by the output data division unit.

5. An authentication output system according to claim 3, wherein the output data division unit is configured to divide the output data in a division form in which at least two of the divided output data are required for the output data configuration unit to configure one of the output data.

6. An authentication output system according to claim 3, wherein the output data division unit is configured, when the output data is classified in units of a predetermined data length, to divide specified bit data of the predetermined data length data from the output data to provide the first divided output data, and to divide all bit data of the predetermined data length data other than the specified bit data from the output data to provide the second divided output data.

7. An authentication output system according to claim 5, wherein the output data division unit is configured, when the output data is classified in units of a predetermined data length, to divide predetermined order data of the output data in units of the predetermined data length from the output data to provide the first divided output data, and to divide data of the output data other than the predetermined order data from the output data to provide the second divided output data.

8. An authentication output system according to claim 1, wherein the second divided output data transmission unit is configured to transmit the divided output data through a TCP/IP.

9. A network device that performs an output based on output data that includes image data, comprising:

a divided output data reception unit that receives divided output data obtained by dividing the output data, including first divided data and second divided data such that the first divided data includes specified bits extracted in units of a predetermined data length beginning with a top of the image data and such that the second divided data includes data of bits other than the specified bits;

a collated information reception unit that receives collated information that includes at least one of identification information for identifying a user, identification information for identifying a device utilization apparatus, and identification information for identifying the output data;

a divided output data save unit that saves divided output data received by the divided output data reception unit and collated information received by the collated information reception unit, into a divided output data storage unit, in their corresponding relationship;

a collation information acquisition unit that acquires collation information including the identification information;

a divided output data acquisition unit that, when determining eligibility to use the output data based on collation information acquired by the collation information acquisition unit and on collated information in the divided output data storage unit, acquires all remaining divided output data out of the divided output data, from the device utilization apparatus;

an output data configuration unit that configures the output data based on divided output data acquired by the divided output data acquisition unit and on corresponding divided output data in the divided output data storage unit;

an output unit that performs the output based on output data configured by the output data configuration unit; and a division procedure information reception unit that receives division procedure information from a division procedure information transmission unit of the device utilization apparatus, the device utilization apparatus having a division procedure determination unit that, having a plurality of division procedures for dividing the output data, determines any one of the plurality of division procedures to transmission to the division procedure information reception unit, the plurality of division procedures including a first division procedure whereby 5 bits of image data are extracted as the first divided data for every 1,000 bits beginning with the top of the image data, a second division procedure whereby 7 bits of image data are extracted as the first divided data for every 1,250 bits beginning with the top of the image data, and a third division procedure whereby 15 bits of image data are extracted as the first divided data for every 2,500 bits beginning with the top of the image data.

10. A network device that performs an output based on output data that includes image data, comprising:

a divided output data reception unit that receives divided output data obtained by dividing output data, including first divided data and second divided data such that the first divided data includes specified bits extracted in units of a predetermined data length beginning with a top of the image data and such that the second divided data includes data of bits other than the specified bits;

a collated information reception unit that receives collated information that includes at least one of identification information for identifying a user, identification information for identifying a device utilization apparatus, and identification information for identifying the output data;

a divided output data save unit that saves divided output data received by the divided output data reception unit and collated information received by the collated information reception unit, into a divided output data storage unit, in their corresponding relationship;

a collation information acquisition unit that acquires collation information including the identification information;

a divided output data acquisition unit that, when determining eligibility to use the output data based on collation information acquired by the collation information acquisition unit and on collated information in the divided output data storage unit, acquires all remaining divided output data out of the divided output data, from the device utilization apparatus; and an output data configuration unit that configures the output data based on divided output data acquired by the divided output data acquisition unit and on corresponding divided output data in the divided output data storage unit;

a division procedure information reception unit that receives division procedure information from a division procedure information transmission unit of the device utilization apparatus, the device utilization apparatus having a division procedure determination unit that, having a plurality of division procedures for dividing the output data, determines any one of the plurality of division procedures to transmission to the division procedure information reception unit, the plurality of division procedures including a first division procedure whereby 5 bits of image data are extracted as the first divided data for every 1,000 bits beginning with the top of the image data, a second division procedure whereby 7 bits of image data are extracted as the first divided data for every 1,250 bits beginning with the top of the image data, and a third division procedure whereby 15 bits of image data are extracted as the first divided data for every 2,500 bits beginning with the top of the image data.

11. An output control program stored in a computer-readable storage medium that performs an output based on output data that includes image data, including a program for allowing a computer to execute a process that has:

a divided output data reception step of receiving divided output data obtained by dividing the output data, including first divided data and second divided data such that the first divided data includes specified bits extracted in units of a predetermined data length beginning with a top of the image data and such that the second divided data includes data of bits other than the specified bits;

a collated information reception step of receiving collated information that includes at least one of identification information for identifying a user, identification information for identifying a device utilization apparatus, and identification information for identifying the output data;

a divided output data save step of saving divided output data received in the divided output data reception step and collated information received in the collated information reception step, into a divided output data storage unit, in their corresponding relationship;

a collation information acquisition step of acquiring collation information including the identification information;

a divided output data acquisition step of, when determining eligibility to use the output data based on collation information acquired in the collation information acquisition step and on collated information in the divided output data storage unit, acquiring all remaining divided output data out of the divided output data, from the device utilization apparatus;

an output data configuration step of configuring the output data based on divided output data acquired in the divided output data acquisition step and on corresponding divided output data in the divided output data storage unit; and an output step of performing the output based on output data configured in the output data configuration step;

a division procedure determining step of determining any one of a plurality of division procedures, the plurality of division procedures including a first division procedure whereby 5 bits of image data are extracted as the first divided data for every 1,000 bits beginning with the top of the image data, a second division procedure whereby 7 bits of image data are extracted as the first divided data for every 1,250 bits beginning with the top of the image data, and a third division procedure whereby 15 bits of image data are extracted as the first divided data for every 2,500 bits beginning with the top of the image data;

a division procedure information transmitting step of transmitting division procedure information indicative of a division procedure;

an output data division step of dividing the output data in accordance with a division procedure determined by the division procedure determining step.

12. An output control program stored in a computer-readable storage medium including a program for allowing a computer to execute a process that has:

a divided output data reception step of receiving divided output data by dividing output data, that includes image data, including first divided data and second divided data such that the first divided data includes specified bits extracted in units of a predetermined data length beginning with a top of the image data and such that the second divided data includes data of bits other than the specified bits;

a collated information reception step of receiving collated information that includes at least one of identification information for identifying a user, identification information for identifying a device utilization apparatus, and identification information for identifying the output data;

a divided output data save step of saving divided output data received in the divided output data reception step and collated information received in the collated information reception step, into a divided output data storage unit, in their corresponding relationship;

a collation information acquisition step of acquiring collation information including the identification information;

a divided output data acquisition step of, when determining eligibility to use the output data based on collation information acquired in the collation information acquisition step and on collated information in the divided output data storage unit, acquiring all remaining divided output data out of the divided output data, from the device utilization apparatus;

an output data configuration step of configuring the output data based on divided output data acquired in the divided output data acquisition step and on corresponding divided output data in the divided output data storage unit;

a division procedure determining step of determining any one of a plurality of division procedures, the plurality of division procedures including a first division procedure whereby 5 bits of image data are extracted as the first divided data for every 1,000 bits beginning with the top of the image data, a second division procedure whereby 7 bits of image data are extracted as the first divided data for every 1,250 bits beginning with the top of the image data, and a third division procedure whereby 15 bits of image data are extracted as the first divided data for every 2,500 bits beginning with the top of the image data;

a division procedure information transmitting step of transmitting division procedure information indicative of a division procedure;

an output data division step of dividing the output data in accordance with a division procedure determined by the division procedure determining step.

13. An output request program stored in a computer-readable storage medium that utilizes a network device, including a program for allowing a computer to execute a process that has:

an output data division step of dividing output data that includes image data, including first divided data and second divided data such that the first divided data includes specified bits extracted in units of a predetermined data length beginning with a top of the image data and such that the second divided data includes data of bits other than the specified bits;

a first divided output data transmission step of transmitting to the network device any of divided output data divided in the output data division step;

a collated information transmission step of transmitting, to the network device, collated information that includes at least one of identification information for identifying a user, identification information for identifying the device utilization apparatus, and identification information for identifying the output data;

a second divided output data transmission step of transmitting to the network device all remaining divided output data out of divided output data divided in the output data division step, in response to an acquisition request from the network device;

a division procedure determining step of determining any one of a plurality of division procedures, the plurality of division procedures including a first division procedure whereby 5 bits of image data are extracted as the first divided data for every 1,000 bits beginning with the top of the image data, a second division procedure whereby 7 bits of image data are extracted as the first divided data for every 1,250 bits beginning with the top of the image data, and a third division procedure whereby 15 bits of image data are extracted as the first divided data for every 2,500 bits beginning with the top of the image data;

a division procedure information transmitting step of transmitting division procedure information indicative of a division procedure;

an output data division step of dividing the output data in accordance with a division procedure determined by the division procedure determining step.

14. An authentication output method in which a network device that performs an output based on output data that includes image data and a device utilization apparatus that utilizes the network device are communicably connected to each other, and in which the network device performs the output through authentication, the method including for the device utilization apparatus:

an output data division step of dividing the output data, including first divided data and second divided data such that the first divided data includes specified bits extracted in units of a predetermined data length beginning with a top of the image data and such that the second divided data includes data of bits other than the specified bits;

a first divided output data transmission step of transmitting to the network device any of divided output data divided in the output data division step; and a collated information transmission step of transmitting, to the network device, collated information that includes at least one of identification information for identifying a user, identification information for identifying the device utilization apparatus, and identification information for identifying the output data, for the network device:

a divided output data reception step of receiving divided output data transmitted in the first divided output data transmission step;

a collated information reception step of receiving collated information transmitted in the collated information transmission step;

a divided output data save step of saving divided output data received in the divided output data reception step and collated information received in the collated information reception step, into a divided output data storage unit, in their corresponding relationship;

a collation information acquisition step of acquiring collation information including the identification information; and a divided output data acquisition step of, when determining eligibility to use the output data based on collation information acquired by the collation information acquisition unit and on collated information in the divided output data storage unit, acquiring all remaining divided output data out of the divided output data, from the device utilization apparatus, a division procedure determining step of determining any one of a plurality of division procedures, the plurality of division procedures including a first division procedure whereby 5 bits of image data are extracted as the first divided data for every 1,000 bits beginning with the top of the image data, a second division procedure whereby 7 bits of image data are extracted as the first divided data for every 1,250 bits beginning with the top of the image data, and a third division procedure whereby 15 bits of image data are extracted as the first divided data for every 2,500 bits beginning with the top of the image data;

a division procedure information transmitting step of transmitting division procedure information indicative of a division procedure;

an output data division step of dividing the output data in accordance with a division procedure determined by the division procedure determining step;

for the device utilization apparatus:

a second divided output data transmission step of transmitting to the network device all remaining divided output data out of divided output data divided in the output data division step, in response to an acquisition request from the network device, and for the network device:

an output data configuration step of configuring the output data based on divided output data acquired in the divided output data acquisition step and on corresponding divided output data in the divided output data storage unit; and an output step of performing the output based on output data configured in the output data configuration step.

* * * * *